(12) United States Patent
Ricciardi

(10) Patent No.: US 9,583,144 B2
(45) Date of Patent: Feb. 28, 2017

(54) SYSTEM AND METHOD FOR CREATING A SPORTS VIDEO

(71) Applicant: PLAAY, LLC, Briarcliff Manor, NY (US)

(72) Inventor: Christopher Ricciardi, Briarcliff Manor, NY (US)

(73) Assignee: PLAAY, LLC, Briarcliff Manor, NY (US)

( * ) Notice: Subject to any disclaimer, the term of this patent is extended or adjusted under 35 U.S.C. 154(b) by 0 days.

(21) Appl. No.: 15/052,728

(22) Filed: Feb. 24, 2016

(65) Prior Publication Data

US 2016/0247537 A1 Aug. 25, 2016

Related U.S. Application Data

(60) Provisional application No. 62/120,127, filed on Feb. 24, 2015.

(51) Int. Cl.
| | |
|---|---|
| H04N 5/445 | (2011.01) |
| G11B 27/036 | (2006.01) |
| G11B 27/34 | (2006.01) |
| G06K 9/00 | (2006.01) |
| H04N 21/8549 | (2011.01) |
| H04N 21/218 | (2011.01) |
| H04N 21/43 | (2011.01) |
| H04N 21/4223 | (2011.01) |

(52) U.S. Cl.
CPC ........ *G11B 27/036* (2013.01); *G06K 9/00751* (2013.01); *G11B 27/34* (2013.01); *H04N 21/21805* (2013.01); *H04N 21/4223* (2013.01); *H04N 21/4307* (2013.01); *H04N 21/8549* (2013.01)

(58) Field of Classification Search
CPC .......... H04N 21/4307; H04N 21/8549; G06K 9/00751
See application file for complete search history.

(56) References Cited

U.S. PATENT DOCUMENTS

| | | |
|---|---|---|
| 6,711,590 B1 | 3/2004 | Lennon |
| 7,203,693 B2 | 4/2007 | Carlbom et al. |
| 7,904,814 B2 | 3/2011 | Errico et al. |
| 9,138,652 B1 * | 9/2015 | Thompson ......... H04N 21/2358 |

(Continued)

FOREIGN PATENT DOCUMENTS

WO 2014142758 9/2014

OTHER PUBLICATIONS

Lu, Wei-Lwun, et al., "Learning to Track and Identify Players from Broadcast Sports Videos," IEEE Transactions on Pattern Analysis and Machine Intelligence, 2012. 14 pps.

(Continued)

*Primary Examiner* — Olugbenga Idowu
(74) *Attorney, Agent, or Firm* — Dentons US LLP

(57) ABSTRACT

A system and method for creating a sports video may include receiving video of a sporting event inclusive of players with unique identifiers on their respective uniforms. At least one unique identifier of the players in the video may be identified. Video segments may be defined from the video inclusive of the at least one unique identifier. Video segments inclusive of the at least one unique identifier may be caused to be individually available for replay.

25 Claims, 30 Drawing Sheets

(56) References Cited

U.S. PATENT DOCUMENTS

| | | | |
|---|---|---|---|
| 2010/0005485 A1* | 1/2010 | Tian | G06F 17/30787 725/32 |
| 2011/0173235 A1 | 7/2011 | Aman et al. | |
| 2012/0057852 A1 | 3/2012 | Devleeschouwer et al. | |
| 2013/0322689 A1 | 12/2013 | Carmichael et al. | |
| 2014/0186004 A1* | 7/2014 | Hamer | H04N 21/21805 386/223 |
| 2016/0203843 A1* | 7/2016 | Beals | G11B 27/105 386/230 |

OTHER PUBLICATIONS

Ye, Qixiang, et al., "Jersey Number Detection in Sports Video for Athlete Identification," Institute of Computing Technology of Chinese Academy of Sciences, China, vol. 5960, Jul. 31, 2006, pp. 1599-1606.

Ye, Qixiang, et al., "Sports Video Analysis: Semantics Extraction, Editorial Content Creation and Adaption," National Lab of Pattern Recognition, Institute of Automation, Chinese Academy of Sciences, Beijing, China, Journal of Multimedia, vol. 4, No. 2, Apr. 2009, pp. 69-79.

Ballan, Lamberto, et al., "Semantic Annotation of Soccer Videos by Visual Instance Clustering and Spatial/Temporal Reasoning in Ontologies," Media Integration and Communication Center, University of Florence, Italy, 2009, 25 pps.

Plestina, Vladimir, et al., "A Modular System for Tracking Players in Sports Games," International Journal of Education and Information Technologies, Issue 3, vol. 3, 2009, pp. 197-204.

* cited by examiner

SYSTEM AND METHOD FOR CREATING A SPORTS VIDEO

RELATED APPLICATIONS

This application claims priority to provisional patent application Ser. No. 62/120,127 filed on Feb. 24, 2015, the contents of which are incorporated herein by reference in their entirety.

BACKGROUND

Sports has a wide range of players, levels, supporters, and fans. Players may range from beginners (e.g., 4 years old and higher) to professionals. The levels of sports teams may range from beginners through professionals. Supporters of sports teams and players may include family members, assistants, volunteers, former players, and coaches. Fans may include family members and people who like the sport, team, or team members.

Coaches and players often find reviewing practice and game video footage useful in helping players and teams improve their performance. In the case of an individual player, video footage of the individual player's actions is beneficial to view so that the individual player can see what he or she did well and not so well.

With low-funded teams (e.g., non-professional teams), video editors who can review video footage to identify specific segments related to specific players is generally not an option due to cost. Moreover, even if a video editor is willing to work at no or low cost, the amount of time needed to create video segments for specific players is not always feasible due to games being long and manually reviewing the footage to identify the specific players in specific video segments is difficult, especially when there are multiple players who enter and exit video scenes.

Beyond the obvious use of the video footage to assist players and coaches in improving skills and teamwork, families and friends of a player often like to view the player during a game without having to watch or fast forward through an entire game, but rather be able to see the player when he or she is "in action." Additionally, video scrapbooks or gifts for family, such as grandparents who live far away, are often desired, but tend to be costly due to tedious editing processes that currently exist. Moreover, for gifted athletes who want to provide video clips to prospective colleges or professional teams, or scouts of professional teams looking for gifted athletes, creation of quality video segments that meet their respective needs is a time consuming process.

For amateur sports, there is a desire to view the players from multiple angles and from unique angles (e.g., from goal viewpoint, overhead, sidelines, home team side, away team side). However, the availability of collecting such video footage is not possible for a variety of reasons, and establishing a coordinated control structure for such a video production is generally not financially possible.

Hence, there is a need for a system and process (i) to expedite identification of players on sports teams in video footage, (ii) to capture video footage of sport teams from multiple mobile recording devices, possibly disparate recording devices, and from different angles, and (iii) to synthesize and organize video footage, optionally in real-time, that is cost effective.

SUMMARY

To provide for a cost effective and expedited process to gather videos at games from multiple video recording devices, such as mobile devices with video recording capabilities (e.g., smart phone), to identify players on sports teams in video footage, character recognition functionality capable of identifying player numbers on jerseys or other items (e.g., vehicles) that are visible within video footage may be utilized to identify players and flag or otherwise identify video footage. By using character or other identifier recognition, an automated video editor to generate video footage clips with one or more specific players within video content of a video may be enabled. In one embodiment, a real-time process may be used to process the video content that is being captured. Alternatively, a post-processing process may be utilized. As a player's number may be visible and non-visible during a particular segment during which the player is still in the scene (e.g., when the player turns sideways or backwards to the camera), an algorithm to specify tracking rules or a tracking system may be used to track the player's head and/or other features so that video clips in which the player is in the video may be identified.

In capturing the video, and in one embodiment, a mobile app may be available for users who attend sporting event to download to a mobile device. The mobile app may enable video to be captured and uploaded. In using the mobile app, an actual and/or relative timestamp may be applied to video content captured by users at a sporting event, thereby enabling the video content captured by multiple users to be synchronized. By multiple users, such as family members, team staff, or otherwise, the video content may be captured at multiple angles and used for editing purposes.

In one embodiment, the system may enable a user to enter a particular player number and the system may identify all video frames and/or segments in which the player wearing that number and optionally color of the uniform of the player appears so that the user may step to those video frames and/or segments. If there are multiple, continuous frames in which the player wearing the number is identified, the system may record the first frame of each of the continuous frames so that the user can quickly step through each different scene. For example, in the case of football, each line-up in which a player participates may be identified. If a sport, such as soccer, is such that the player's number tends to be visible and non-visible during a play simply because of the nature of the sport, then the system may use a tracking system to identify when the player (not the player's number) is visible in a video clip, thereby identifying entire segments during which a player is part of the action. In one embodiment, an algorithm may be utilized to keep recording for certain number of frames/seconds between identifications of a player.

In one aspect, in response to identifying a particular number on a uniform of a player, a notification may be generated and sent to one or more mobile devices participating in a group at a sporting event to alert fans of action involving one or more players. If a mobile app that operates as a social network, for example, is being used by fans at a game, then each of the fans using the app may set search criteria so that in the event of another fan at the game capturing video content with that search criteria, a notification may be sent to the fan who sent the search criteria and be able to download that video content to view the video content that matched the search criteria. In one embodiment, the search criteria may include player number, team name and/or uniform colors, action type, video capture location (e.g., home team side, visitor team side, end zone, yard line, etc.).

One method for creating a sports video may include receiving video of a sporting event inclusive of players with unique identifiers on their respective uniforms. At least one unique identifier of the players in the video may be identified. Video segments may be defined from the video inclusive of the at least one unique identifier. Video segments inclusive of the at least one unique identifier may be caused to be individually available for replay.

One method for generating video content may include receiving multiple video content segments of a sporting event from video capture devices, the video capture devices operating to crowd source video content. A player in one or more of the video content segments may be identified. At least a portion of video content inclusive of the player may be extracted from the one or more video content segments with the player, and be available for viewing by a user.

One method for sharing video of a sports event may include receiving, by a processing unit via a communications network, a request inclusive of at least one search parameter from a video capture device. Video content being received by a plurality of video capture devices at the sports event may be processed to identify video content from any of the video capture devices at the sports event inclusive of the at least one search parameter. Responsive to identifying video content inclusive of the at least one search parameter, video content may be communicated by the processing unit via the communications network to the video capture device.

One embodiment of a system for processing video of a sporting event may include an input/output unit configured to communicate over a communications network and receive image data. A storage unit may be configured to store image data captured by a plurality of users of a single event. A processing unit may be in communication with the input/output unit and the storage unit. The processing unit may be configured to receive image data being captured real-time from an electronic device, the image data being portions of complete image data of unknown length while being captured by the electronic device. The image data portions may be processed to identify at least one unique identifier associated with a player in the sporting event. Successive video segments may be stitched together. The receiving, processing, and stitching of the image data may be repeated until an end of video identifier is received. The completed stitched video may be stored in the storage unit for processing.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
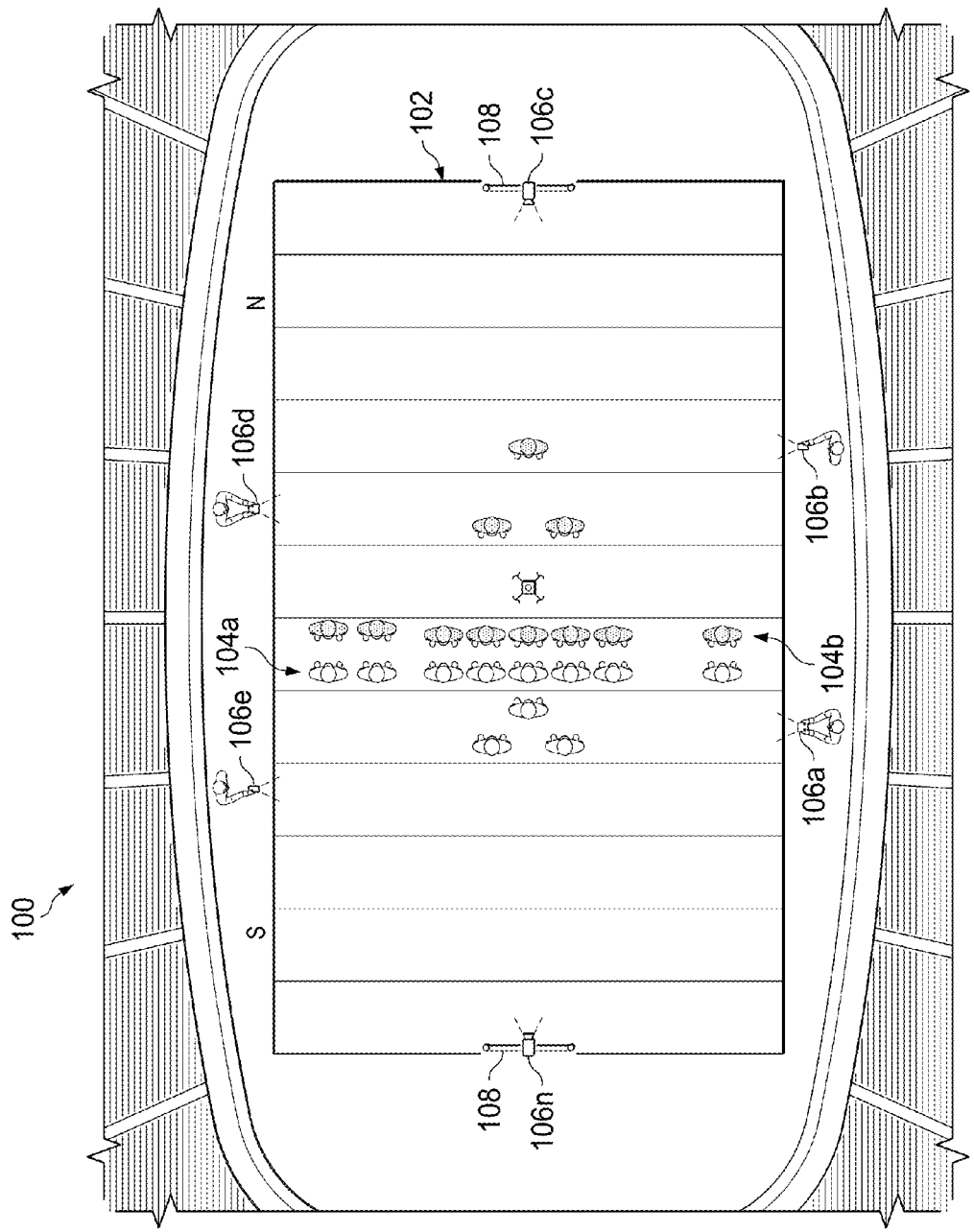
FIG. 1 is an illustration of an illustrative scene inclusive of a sports playing field.

With regard to FIG. 1, an illustration of an illustrative scene 100 inclusive of a sports playing field 102 is shown. The sports playing field 102 includes two teams of players 104a and 104b (collectively 104) playing thereon. As understood in the art, players of sports teams typically wear jerseys or uniforms inclusive of numbers and/or other identifiers. As shown, the players of the two teams 104 are matched up against one another. It should be understood that other aspects include video recording a team practice, where players from only a single team are recorded while playing on the sports playing field 102. As is typically the case, fans, supporters, spectators, team management, or otherwise record video of the teams who are playing. As shown, video recording devices 106a-106n (collectively 106) that are positioned at different angles around the field 102 may be used to capture or record video of the teams 104 during a game. The video capture devices 106 may be the same or disparate mobile devices, such a smart phones, tablets, video cameras (e.g., GoPros®), or any other video capture device that may be networked or non-networked, but be capable of uploading video content in any manner, as understood in the art. Video recording devices 106c and 106n may be respectively mounted to goalposts 108 at a north (N) end and south (S) end of the sports playing field 102.

Figure 2:
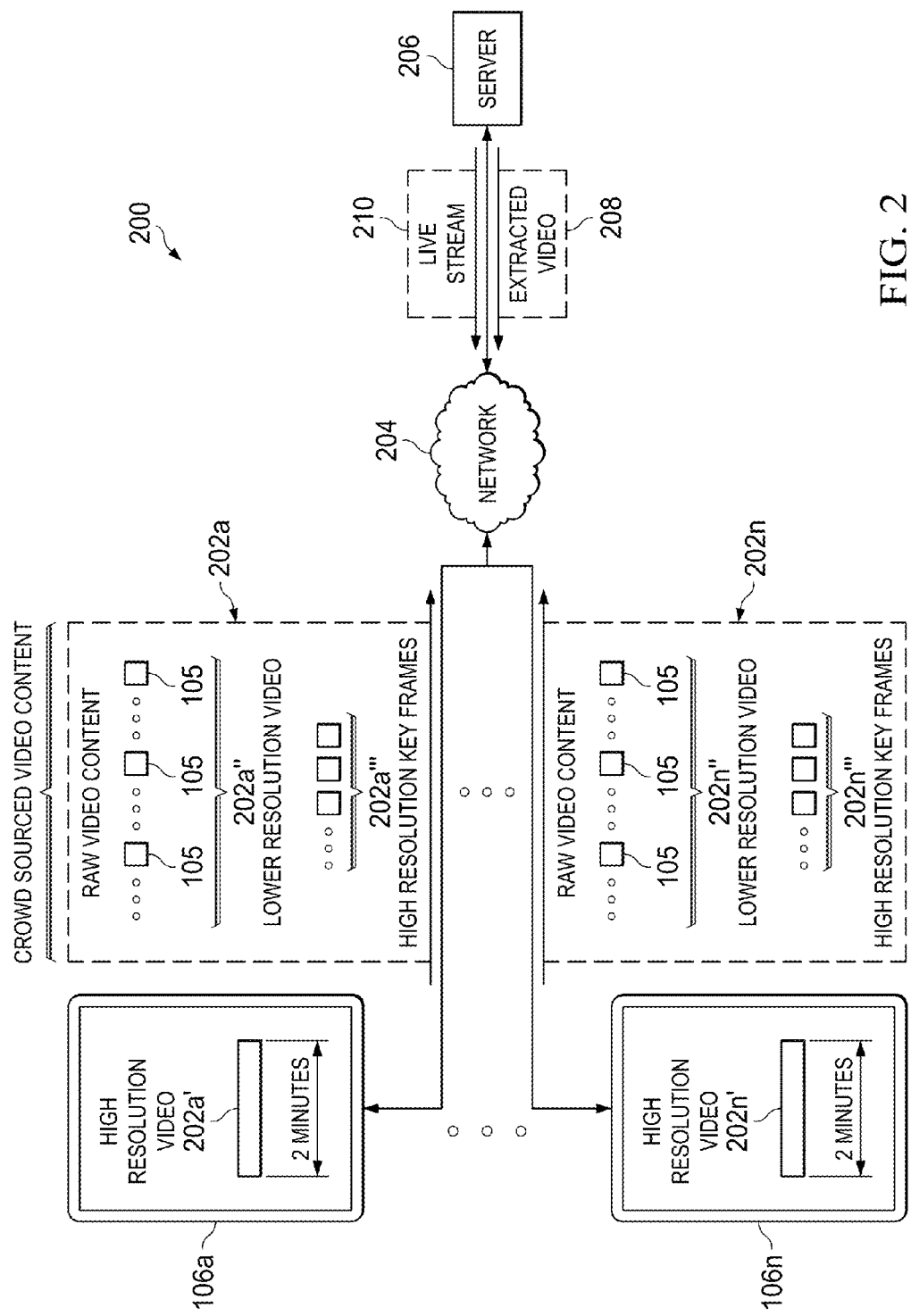
FIG. 2 is an illustration of a network environment in which crowd sourced video of a sporting event is captured and processed.

With regard to FIG. 2, an illustration of a network environment 200 in which crowd sourced video or user generated content of a sporting event is captured and processed is shown. The network environment 200 includes the video capture devices 106 that may capture raw video content or video 202a-202n (collectively 202), and communicate the raw video content 202 via a communications network 204 (e.g., WiFi, cellular, and/or Internet) to a server 206. Because mobile devices are able to capture data in high-resolution, the size of video or video data files these days can be quite large (e.g., several megabytes). As a result, the amount of time and bandwidth needed to upload the video data files can be considerable. Rather than waiting for a user to complete a video, which is unknown in size before completed, so as to operate in a more real-time basis, one embodiment of an app being executed by the video capture devices 106 may include communicating the captured video 202 on a periodic (e.g., every 5 or 10 seconds) or aperiodic basis (e.g., responsive to an event occurring), but prior to completion of recording of an entire video.

As an example, a 2-minute video $202n'$ is shown to be captured and stored in video capture device 106n. In one embodiment, while capturing the video $202n'$, short (e.g., 10-second) video segments $202n''$ (i.e., portions of a complete video of unknown length while being captured) may be communicated via the network 204 to the server 206. The server 206 may, in one embodiment, process the video segments $202n''$ as received. In an alternative embodiment, rather than uploading the video $202n'$ in a real-time manner, app on the video capture device 106n may be configured to capture the entire video $202n'$ and send multiple, short video segments $202n''$, such as 10-seconds (10 s), via the communications network 204 to server 206. The server 206 may be configured to receive the video segments $202n''$ and to "stitch" the video segments $202n''$ into the full-length video $202n'$. In one embodiment, an end video code or identifier may be communicated with the last video segment that completes a full video so that the server 206 may determine that the video is complete and store the completed video. In addition to providing a more real-time process, but sending the video segments $202n''$ while recording, other processing and communications may be performed during the recording and communication processes.

Moreover, because the video content that is captured may be high-resolution (e.g., 1080p), the amount of extra data that is to be sent as compared to a lower resolution, such as 640p or 720p, is significant, especially for longer videos. In the event that the application is capturing humans, which do not move relatively fast over a 1-second timeframe, one aspect may capture the video content at a higher resolution, but communicate the content at a lower resolution, thereby provide video quality that is acceptable to view, but utilizes lower bandwidth, takes less time to communicate, and consumes less memory at the server and when viewed on other devices after editing. However, because an image processing algorithm(s) performed by the server may have improved performance with higher resolution, especially for number and color identification, reducing the resolution may also reduce performance of the image process. To provide for improved performance of the image processing algorithm(s) while simultaneously accommodating the communication and memory capacity performance, one embodiment provides for communicating one or more frames per second at the high-resolution or key frames $202n'''$, and video $202n''$ at a lower resolution. In one aspect, the video capture devices 106 may be configured to communicate every 12th frame (e.g., one per ½ second if frame capture rate is 24 frames per second) as high-resolution (e.g., 1080p) images $202n'''$, and the video $202n''$ at lower resolution. In the event that the sport being imaged is a sport that players move faster than running, such as skiing, skating (e.g., hockey), car racing, etc., higher frame rates (e.g., 4 high-resolution frames per second or every 6 frames if the video capture rate is 24 or 25 frames per second) of the high-resolution frames $202n'''$ may be communicated along with the lower resolution video $202n''$. If every 12th frame $202n'''$ is a high-resolution frame and the frame capture rate is 24 frames per second, then a 10-second video includes 20 high-resolution frames $202n'''$. The 20 high-resolution frames $202n'''$ may be included in the video segments $202n''$ being communicated or separate from the video segments $202n''$. It should be understood that other video capture rates and individual high-resolution image rates may be utilized based on a variety of factors, including type of sport, amount of communication bandwidth, storage capacity, or otherwise.

The server 206 may be configured to identify video segments that comply with search parameters to form an extracted video 208 as desired by users of the video capture devices 106 or other users, such as family members of players of sports teams. The extracted video 208 may include video content that complies with input search parameter(s) by a user that includes a player identifier of a sports team. In one embodiment, the server 206 may be configured to identify a player wearing a particular number on his or her jersey, and extract video content or video segments inclusive of the jersey with the particular number. In one aspect, the server 206 may be configured to extract video with a player having certain jersey colors, such as blue with white writing, such as numbers. The server 206 may also be configured to extract video that matches a particular action identifiable by a user generated and/or automatically generated tag associated with video content. As shown, a live stream 210 may be communicated from the server to one or more of the video capture devices 106 that request to receive video from others of the video capture devices 106, as further described with regard to FIGS. 14A-14C.

Figure 3:
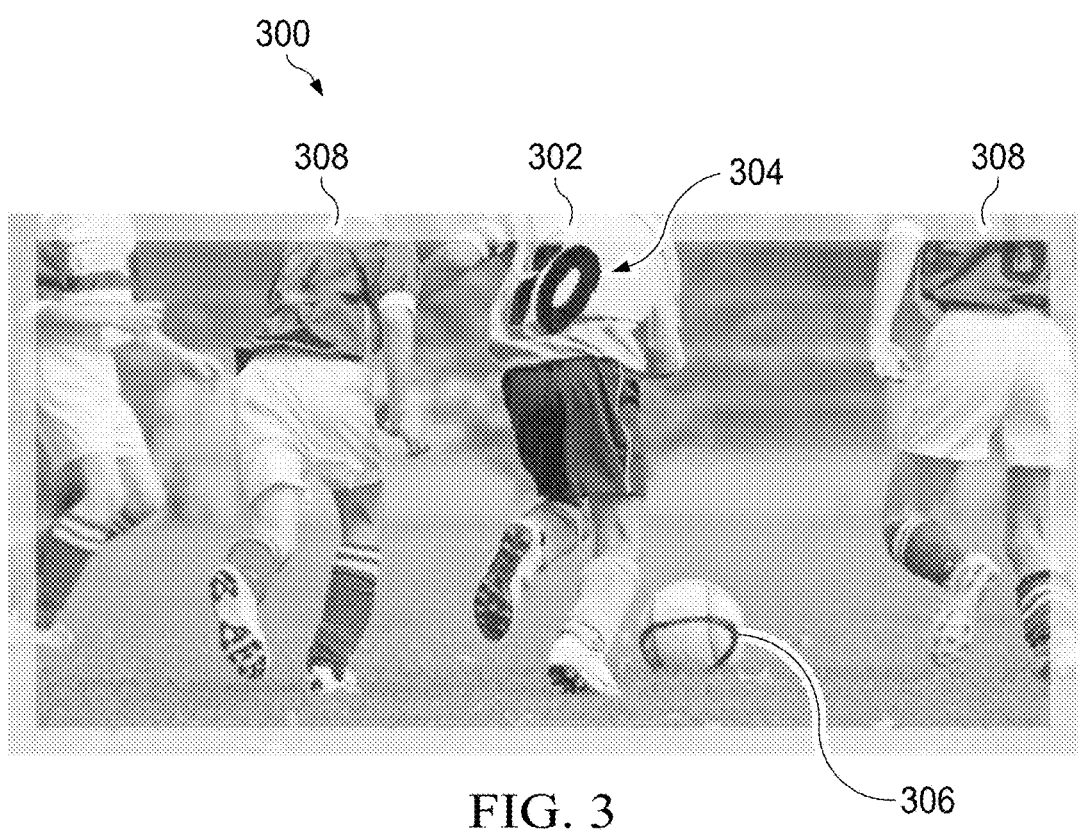
FIG. 3 is an image of an illustrative scene in which a player, in this case a soccer player, is shown to be running on a playing field.

With regard to FIG. 3, an image of an illustrative scene 300 in which a player 302, in this case a soccer player, is shown to be running on a playing field. The player 302 has an identifier 304, in this case number "10," on his uniform that has dark writing on a light uniform. The player 302 is shown to be dribbling a soccer ball 306, and being chased by players 308 on another team, generally wearing different color uniforms, trying to take the soccer ball 306 from the player 302. As will be described further herein, a system may be configured to (1) identify a player wearing a particular identifier, such as number "10," and (2) being in "the action," such as being near a ball (e.g., football, soccer ball, basketball), or other sports item. Rather than being automatically identified, a crowd edited process for identifying action(s) by players may be performed in a semi-automated or manual manner, as further described herein.

Figure 4:
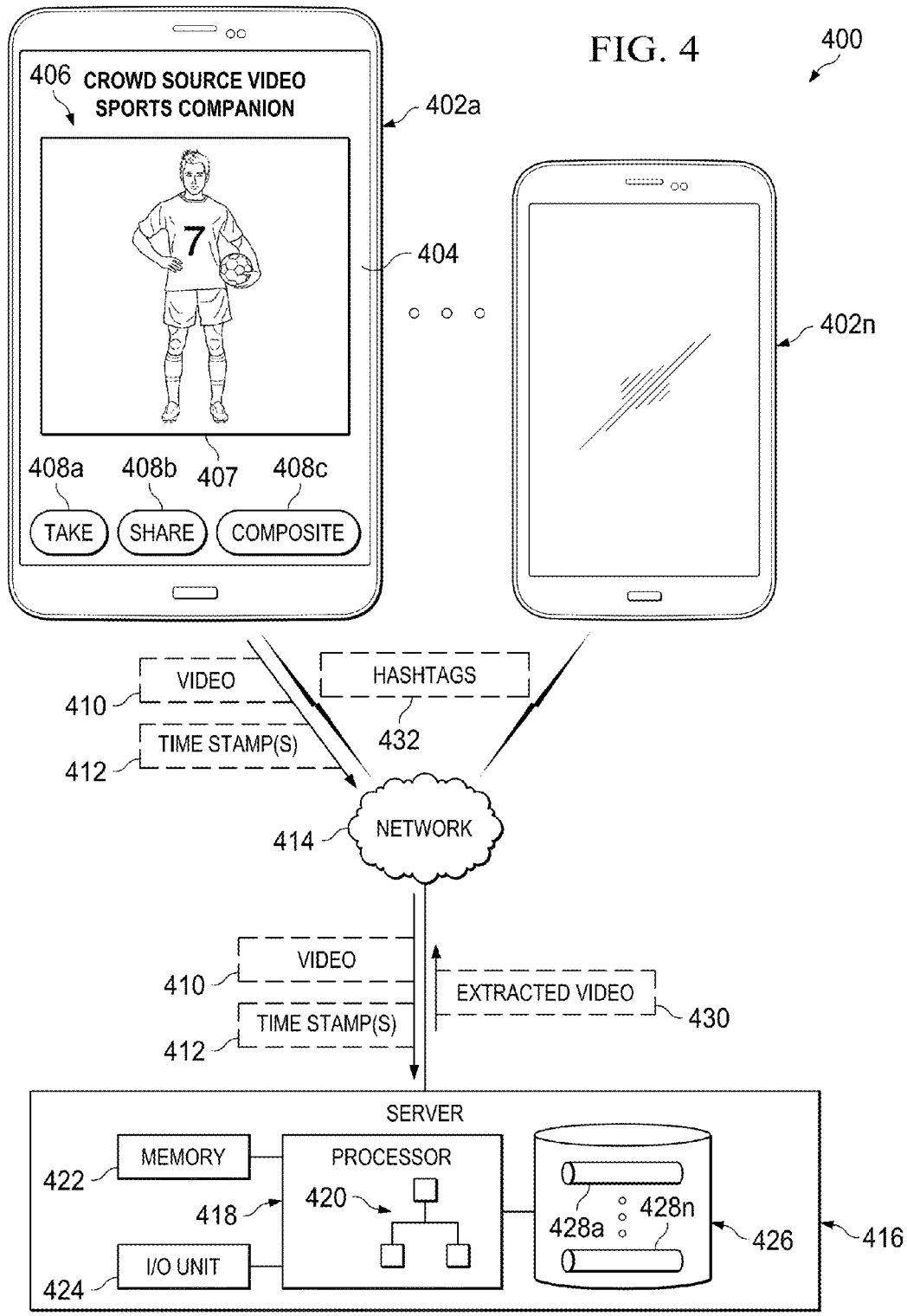
FIG. 4 is an illustration of an illustrative network environment shown to include a video capture device, such as a smart phone, being configured with a mobile app that enables a user of the video capture device to capture video content, and provide for extracting particular video content desired by the user.

With regard to FIG. 4, an illustration of an illustrative network environment 400 is shown to include a video capture device 402a, such as a smart phone, being configured with a mobile app that enables a user of the video capture device 402a to capture video content, and have the ability to extract or cause to extract particular video content desired by the user. The video capture device 402 may include an electronic display 404 on which user interface 406 may be displayed. The user interface 406 is shown to include an image 407 of a player on a playing field, for example. Control buttons 408a, 408b, and 408c (collectively 408) are shown to enable the user to take a video, share a video, and create or request a composite or extracted video, respectively. A composite video is video formed of one or more video clips or segments (or references to timestamps within one or more video clips or segments) that combined form a video that may be viewed by a user. It should be understood that additional and/or alternative control elements 408 may be available via the mobile app being executed by the video capture device 402a, as well. As understood in the art, the app may be downloaded from an app store or other network location.

The video capture device 402a may be configured to communicate video 410 (i.e., video content in a digital data format) and timestamps 412 representative of times that the video 410 is captured. The video 410 may be in the form of video clips (e.g., less than 2 minutes in length or be a full, continuous video of an entire sporting event). In one embodiment, an app on the video capture device 402a may be configured to record actual times or relative times at which video is captured, and those times may be associated with the video 410. The video 410 and timestamps 412 may be communicated via a communications network 414 to a server 416. The server 416 may include a processing unit 418, which may include one or more computer processors, including general processor(s), image processor(s), signal processor(s), etc., that execute software 420. The processing unit 418 may be in communication with a memory unit 422, input/output (I/O) unit 424, and storage unit 426 on which one or more data repositories 428a-428n (collectively 428) may be stored. The video 410 and timestamps 412 may be received by the processing unit 418, and processed thereby to generate an extracted video 430 based on parameters, such as player identifier, action type, or any other parameter, as desired by a user of the video capture device 402a or otherwise. The video 410 and timestamps 412 may be stored in the data repositories 428 by the processing unit 418, and the extracted video 430 may be communicated via the I/O unit 424 to the video capture device 402a for display thereon.

In one embodiment, the software 420 may be configured to store video 410 in the data repositories 428 in a manner that the video operates as reference video for the extracted video 430. That is, rather than making copies of the video 410 stored in the data repositories 428 for individual users, the video 410 may be referenced using computer pointers or indices, as understood in the art, to refer to a memory location or timestamp in the source video so that duplicate copies of the video 410 are not needed. The extracted video 430 may be copies of subsections of the video 410 or entire video that is accompanied with pointers or timestamps (not shown) to point to sections of the video that meet criteria of the user who receives the extracted video 430. Rather than communicating copies of video in file form, the video may be streamed to the video capture 402a.

In one embodiment, additional video capture devices 402 may be configured to capture video in the same or similar manner as the video capture device 402a, and the server 416 may be configured to receive and process video captured by multiple video capture devices to generate a crowd sourced video, where the crowd sourced video may include video clips or content segments from different angles at a sporting event. The crowd sourced video may be a single video file inclusive of video clips available from the crowd sourced video clips or video clips that match search parameter(s), as further described herein. In one embodiment, in addition to communicating video 410 and timestamps 412, additional information, such as geographic location or identifier of a field or sporting event may be generated and communicated by the video capture device 402a to the server 416, so that multiple video capture devices 402 that are recording video at the same event may be associated and stored with one another for processing by the server 416. For example, the app may be configured to enable the user to create or select a name of a sporting event at a particular geographic location that is occurring, such as Norwood Mustangs versus Needham Rockets at Norwood High School Field, and that information may be uploaded, with or without video and timestamp information, to a server so that other users who are also at the same game, such as a high school football game, may be able to select the name of the event from a selectable list of games being played at a geographic location given that multiple games are often played at a single park or field, for example.

As is further described herein, video or video clips 410 may be collected by multiple users and video capture devices 402. The video clips 410 may be stored by the server 416 that enables the users to access the video clips 410 for producing crowd edited video. In crowd editing, the video clips 430 may be communicated to or otherwise accessed by the users to view and associate hashtags 432 or other identifiers that enable users to perform more accurate searching and more easily produce composite videos. In an alternative embodiment, the server 416 may be configured to semi-automatically or automatically tag video clips with hashtags.

Figure 5:
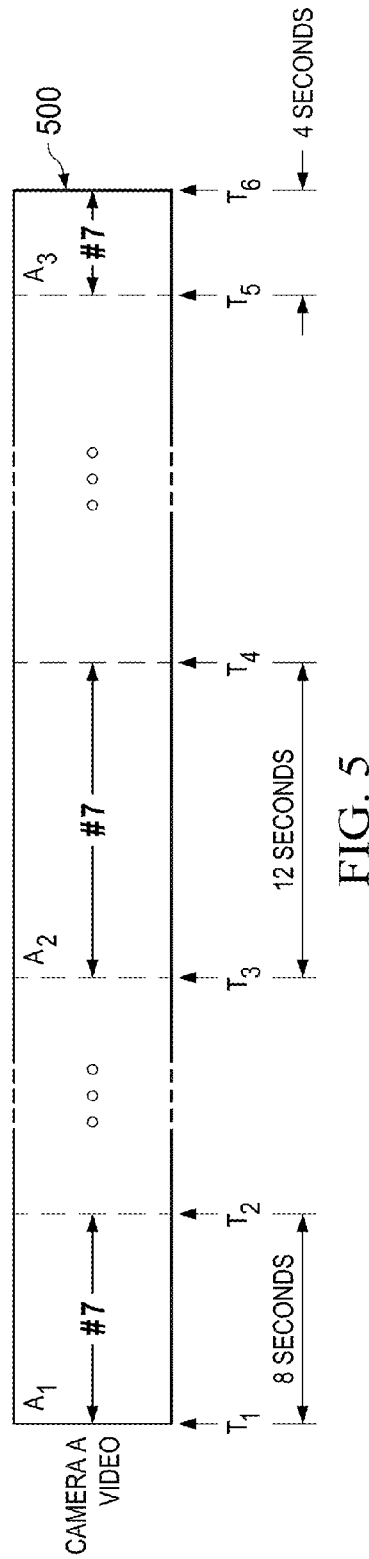
FIG. 5 is an illustration of an illustrative sports video indicative of video segments that include a particular player wearing a particular player number.

With regard to FIG. 5, an illustration of an illustrative video 500 is shown. The video 500 is captured from camera A, and includes a number of video segments, $A_1$, $A_2$, and $A_3$, in which a player wearing the number "7" on his or her jersey, which has a color scheme that may optionally be used for identification purposes, is captured. Video segment $A_1$ is 8 seconds long and extends between timestamps $T_1$ and $T_2$. Video segment $A_2$ is 12 seconds long and extends between timestamps $T_3$ and $T_4$. Video segment $A_3$ is 4 seconds long and extends between timestamps $T_5$ and $T_6$. The video segments between timestamps $T_2$ and $T_3$, and $T_4$ and $T_5$ may be determined to not include video footage of the player wearing number "7" on his or her uniform. As will be described further herein, the user may desire to have a video created that includes only video segments $A_1$, $A_2$, and $A_3$, thereby shortening his or her review time of, or focusing on, all the plays in which player wearing number "7" was captured. An extracted video (not shown) that includes only the video segments $A_1$, $A_2$, and $A_3$ may be created. In one embodiment, short fade-to-black or other transition video segments may be displayed between video segments $A_1$, $A_2$, and $A_3$. Alternatively, pauses between video segments $A_1$, $A_2$, and $A_3$ may be set to enable a user to selectively continue watching or not.

Figure 6B:
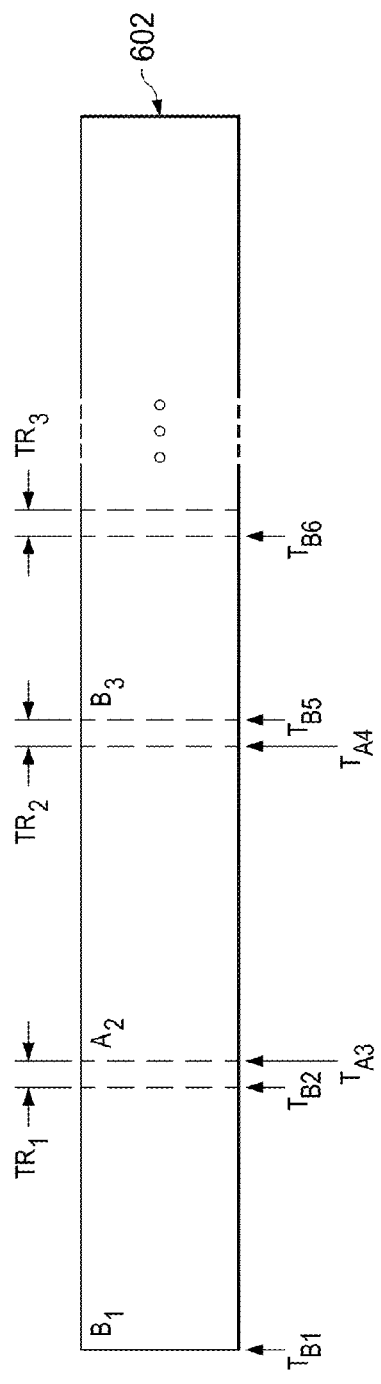
FIG. 6B is an illustration of an extracted video shown to include video segments B1, A2, and B3, which were originally in videos A and B of FIG. 6A.
Figure 6A:
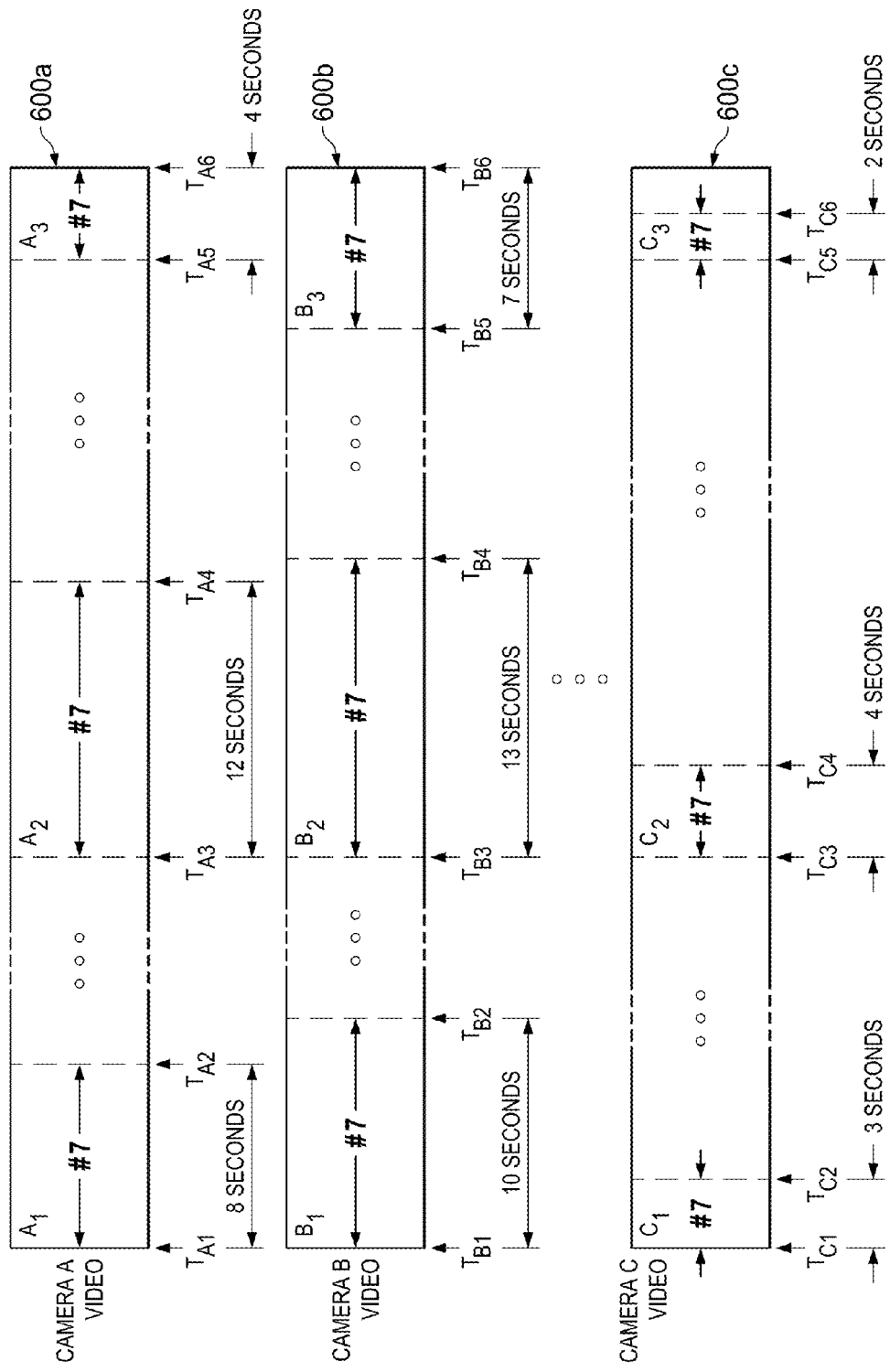
FIG. 6A is an illustration of three videos A, B, and C that were captured from three different video cameras, camera A, camera B, and camera C.

With regard to FIG. 6A, an illustration of three videos A, B, and C that were captured from three different video cameras, camera A, camera B, and camera C, are shown. In each of the videos, video segments including player wearing jersey number "7" were captured. In video A, video segments $A_1$, $A_2$, and $A_3$ include a player wearing jersey number "7." In video B, video segments $B_1$, $B_2$, and $B_3$ includes content with the player wearing jersey number "7," and in video C, video segments $C_1$, $C_2$, and $C_3$ include video content with player number "7." In one embodiment, the videos 600 may be communicated to a central location, such as a server, so that a crowd sourced video can be produced. In another embodiment, the crowd sourced video may include the longest, best, most action filled, or simply include the player wearing jersey number "7." Tags applied to the videos 600 may be used in identifying video clips and assembling an aggregated or extracted video or presenting the identified video clips.

With regard to FIG. 6B, an extracted video 602 is shown to include video segments $B_1$, $A_2$, and $B_3$, which were originally in videos A and B of FIG. 6A. Each of the video segments $B_1$, $A_2$, and $B_3$ were determined to be the longest video segments and/or least shaking, most in focus, etc. in which the player with identifier number "7" on his or her uniform was captured in the three videos of FIG. 6A. Between video segments $B_1$, $A_2$, and $B_3$, transition video segments $TR_1$, $TR_2$, and $TR_3$, are shown. These transition video segments may be utilized to make the video more aesthetically pleasing to a viewer. The transition segments $TR_1$, $TR_2$, and $TR_3$ may be fade-to-black or any other video transition segment, as understood in the art. In one embodiment, the video segments $B_1$, $A_2$, and $B_3$ or video segments in which the player is carrying or near the ball, basket, goal, or any other location on a sports field, as further described herein.

Figure 7:
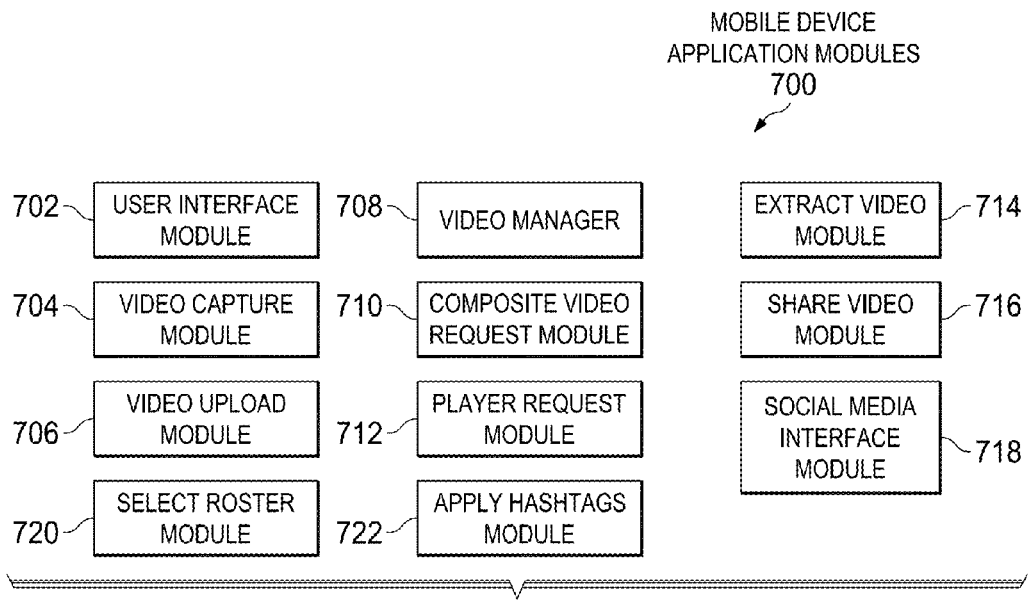
FIG. 7 is a block diagram of illustrative app modules that may be executed on a mobile device.

With regard to FIG. 7, a block diagram of modules 700 of a mobile device app is shown. The modules may be executed by a processor of the mobile device, such as a smart phone, and may be utilized to capture video, communicate video, process video, and perform a variety of other functions for a user of the mobile device. In this instance, the mobile device operates as a video capture device utilizing the mobile app. In an alternative embodiment, the mobile device simply uses a conventional video capture application, and the video captured may be communicated to a server for processing thereat. It should be understood that the mobile app may be resident or not resident (e.g., cloud based) on the mobile device.

The module 700 may include a user interface module 702 that provides the user with interactive functionality via a touchscreen or other user interface on a mobile device, as understood in the art. The user interface module 702 may operate as a conventional application that, in this case, enables video capturing, video management, and video processing or establishing search parameters or criteria for video processing to be performed. For example, the user interface module 702 may provide a user interface element that enables the user to select a number of a player on a particular team along with a minimum amount of time for the player to be in a scene or performing a particular type of play (e.g., batting). The module 702 may also provide for a user to review video clips and assign one or more tags to the video clips.

A video capture module 704 may be configured to enable the user to capture video utilizing the app. In one embodiment, rather than the app providing the video capture capability, the app may utilize a standard video capture application on a mobile device, and allow the user to access or import the video that was captured on the mobile device.

A video upload module 706 may be configured to enable a user to upload video that was captured on the mobile device. The video upload module 706 may enable the user to select some or all of the video that the user captured during a game. In operation, the video upload module 706 may be configured to upload in small (e.g., 5 or 10 second increments) as the video is being captured, as previously described with regard to FIG. 2, so that the video upload process can be performed in a substantially real-time basis. As previously described, by uploading the video as it is being captured, the mobile device can perform other communication tasks between the uploads of the video and a server may process the video segments as received. In an alternative embodiment, the video (e.g., 2-minutes) may be fully captured and sent in smaller segments (e.g., 10 second segments). A selectable setting may be set by a user of the mobile device for how the video is to be uploaded. By uploading video content in short segments or segment fragments (e.g., 5 or 10 second segments), the mobile device may be able to perform additional communications operations between uploads. Moreover, because some communications networks limit length of video uploads, sending portions of the video may allow for a video that exceed network length or size limits to be uploaded. The module 706 may apply tags or other identifiers to the video segments to indicate whether a video segment being uploaded is the start of a new video, continuation of previous video segment (s), or last video segment. Moreover, the video segments may be encrypted or otherwise encoded to limit the ability for video to be intercepted and accessed by someone not authorized to view the video.

As previously described, the video may be high-resolution video (e.g., 1080p), which takes a lot of bandwidth, power, time, and resources to upload from a mobile device and process using image processing. As a result, the module 706 may be configured to upload the video in a lower resolution, such as 640p or 720p. Since image processing by a server to identify certain features in a video may be improved by using higher resolution, the module 706 may be configured to have one frame periodically or aperiodically be high-resolution or extract key frames or sequence of images and communicated separate from a lower resolution video derived from the high-resolution video. In one embodiment, a blur rating of a high-resolution image frame may be determined by measuring straightness of a straight line or other measurement technique and, if the blur rating is below a threshold, send the high-resolution image frame, otherwise, not send the high-resolution image frame and continue testing successive image frames until one passes before sending. The module 706 may determine or be set to keep a frame high-resolution or send separate still images with high-resolution based on a sport or action being recorded. As an example, every 12th frame (if frame rate is 25 frames per second) may be communicated along with or within a video being sent at a lower resolution (e.g., 720p), thereby enabling image processing to be performed on the high-resolution frames. In sending the high-resolution frames, an indicator, such as a timestamp, that corresponds to a frame in the lower resolution video, may be provided to enable processing or tagging of the lower resolution video based on identification of content in the high-resolution images.

In one embodiment, the video upload module 706 may enable to user to apply a name, geographic location, and/or other indicia to be in association with the video, thereby enabling the user and/or server to identify the location, game, or any other information at a later point in time. The information may be established prior to the uploading process, as further described herein. In one embodiment, the identification information may be utilized to crowd source the video with other video that was captured at the same sporting event. If the user elects to participate in a temporary (e.g., for the game) or longer term (e.g., for the season of a team) social media environment, the video upload module may operate to stream data being recorded to a server for real-time processing and/or distribution to other users in the social media environment (e.g., other users at the game).

A video manager 708 may enable the user to review one more videos, store the videos in a particular fashion, identify the videos through timestamps, categories, locations, or any other organizational technique, as understood in the art. The video manager 708 may also be configured to identify and store information identified in the video in a real-time or post-processing manner so that the parameters may be communicate to the server for processing. In an alternative manner, the processing may be performed by the server.

A composite video request module 710 may be configured to enable a user to request a composite or extracted video. The module 710 may provide a user with parameter settings that the user may select and/or set to cause a composite video to be created inclusive of matching or conforming content using those parameters. For example, the module 710 may enable the user to select a particular identifier of a player, a particular action by the player, a particular distance from a ball, a minimum amount of time in a video clip, and so forth. Measurements of distance may be made by using a standard sized object, such as a ball, to determine scale and distance of a player to an object.

A player request module 712 may enable the user to request a player by an identifier on the player's jersey. The module 712 may be incorporated into or be separate from the module 710.

An extract video module 714 may be configured to utilize the input search parameters selected by the user, and utilize image processing to (i) identify video segments within which content that satisfies the parameters or criteria are met, and (ii) set timestamps, pointers, or other indices at the start and end of video segments identified as meeting the parameters. In an alternative embodiment, rather then setting timestamps, pointers, or other indices, video segments may be copied and storage separate from the raw video, and used in creating and extracted video inclusive of one or more video segments in which content satisfies parameters set by the user.

A share video module 716 may be configured to enable a user to share video, raw video and/or extracted video, that he or she captured with other users. In one embodiment, the video may be shared with a limited group, such as friends, family, or other users at a particular sporting event. Alternatively, the share video module 716 may enable the user to share video in a public forum. In sharing the video, the module 716 may communicate the video to a server for further distribution. If the user has agreed to share video in a manner that enables the video to be processed and used as a crowd sourced video for editing purposes, then share video module 716 may communicate a portion or all of the video to a server. If the mobile device app is configured to perform certain types of processing, then the video that is shared by module 716 may be in video segments that meet particular criteria being requested by other users or an administrator. Still yet, the share video module 716 may be configured to work with the video upload module 706 in sharing video in real-time or other sharing arrangement(s).

A social media interface module 718 may enable the user to upload some or all of the video that the user has captured to social media (e.g., user account on FaceBook®). The module 718 may be configured to simply enable the user to select a social media account, and the module 718 may upload desired video or any other information to the social media account for posting thereon. The social media interface module 718 may be configured to manage social media accounts. In one embodiment, the social media interface module 718 may be configured to manage temporary social media network events, where a temporary social media network event may be a social media network set up on a per game or per season basis.

A select roster module 720 may enable a user, such as a coach, to select a roster of players on a team to define player positions on the team. The players on the roster may be assigned player numbers that are to be on their respective uniforms. The roster may enable users to more easily select players by users who are following a team.

An apply hashtags module 722 may be configured to automatically, semi-automatically, or manually enable a user to apply one or more hashtags to a video content segment or clip. In applying the hashtags, video content segments may be provided to the user after capturing the video clips and prior to communicating the video clips to a networked server or provided by the networked server for tagging by user(s), as further described herein. The module 722 may provide the user with soft-buttons, for example, for the user to select to identify action(s) and/or object(s) within the video content segment(s).

Figure 8:
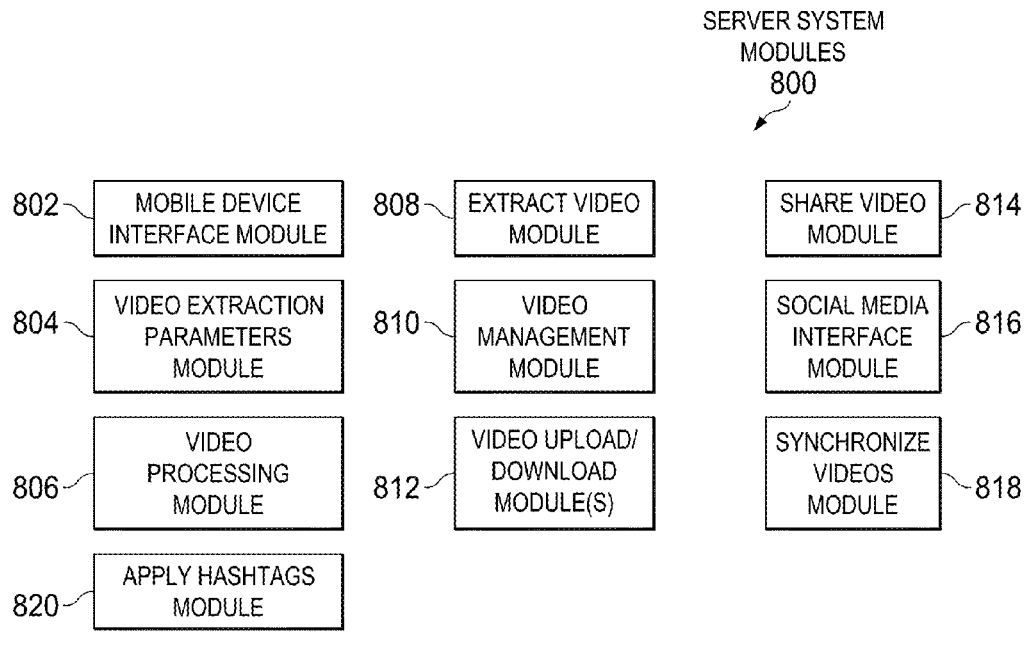
FIG. 8 is a block diagram of illustrative application modules that may be executed on a server.

With regard to FIG. 8, a block diagram of illustrative modules 800 that may be executed on a server is shown. The modules 800 may be utilized to receive, process, and extract video so as to create an extracted video as desired by a user.

The modules 800 made include a mobile device interface module 802 that enables the server to communicate with one or more mobile devices to support a user interface, upload or download video, or perform other functions with mobile devices or other electronic devices, such as computers configured to process video content. The module 802 may be configured to receive video segments in a real-time or semi-real-time basis while a user is capturing a video and store the video segments in a manner that additional video segments of the same video can be appended or "stitched" to the previous video segment(s). Alternative configurations may be utilized depending on how the mobile device that is sending the video to the server is configured. As an example, the video segment may be received after the video is completely recorded and then sent in 10 second video segments, but not necessarily with 10 seconds between each of the segments, as is performed when communicating the video segments during capture of the video. Yet another video transfer mode may allow for the video to be communicated and received as a whole.

In one embodiment, the module 802 may be configured to receive video content that is lower resolution than the resolution of the raw video content captured by the mobile device to reduce upload time, data storage consumption, and processing. As understood in the art, resolution at 640p or 720p on small screens is suitable for most applications. However, image processing to identify certain features within image frames or key frames is improved when performed on image frames with higher resolution (e.g., 1080p). Hence, high-resolution images that are separate from the video or embedded within the video may be received and processed for identifying specific content, such as player numbers on jerseys. Depending on the speed of content being imaged, the frequency of the high-resolution images may vary. In one embodiment, the high-resolution images may be tagged with a timestamp or other identifier that corresponds to a location in a video segment, thereby allowing for marking or otherwise processing the video based on image processing of the high-resolution images.

A video extraction parameters module 804 may be configured to identify parameters that may be used to define specific video content being sought by a user. For example, the extraction or search parameters may include player number, amount of time player is in a segment, proximity of the player to a ball or other region on a playing field, or otherwise. The parameters may be communicated from a mobile device or otherwise to the server, and the module 804 may utilize that information in processing the video to produce an extracted or composite video. In one embodiment, the video extraction parameters module 804 may be configured to process the key frames (e.g., high-resolution images periodically derived from high-resolution video), as opposed to the video that may be in lower resolution than the key frames, to determine content in the key frames. As an example, if player numbers are being searched, the key frames may be used to determine whether a player is in a particular portion of the video by determining that the player number associated with the player is in the key frames. If, however, a determination is made that a player number is in one frame and then a successive frame one-half second later does not show the player number in the image, then a determination may be made as to whether the player simply turned, left the frame, or multiple video segments exist. Other reasons for a player number not being in successive key frames may be possible. Tracking the player numbers within successive key frames may also provide for stitching or not stitching video clips together.

A video processing module 806 may be used to process video captured by one or more users using video capture devices. The module 806 may be configured to format each video from different users and video capture devices into a common format prior to, during, or after processing the video. For example, the video processing module 806 may include a function that measures a standard sized object, such as a soccer ball, football, base, net, etc., in a video and uses that measurement to determine scale of the captured content so as to determine other measurements, such as distance of a player from a ball, distance of a person from a goal, or otherwise, so that a user may submit a search parameter of a player being a certain maximum distance from a ball, goal, basket, etc. That is, if a standard sized object, such as a soccer ball, is measured at a $\frac{1}{10}$th scale, then other objects and distances from the video can be measured using that scaling.

As the standard sized object moves through multiple frames, where the standard sized object moves from being close to being farther from a camera, measurements can be made as the object moves to dynamically determine scale and that scale can be dynamically applied to the other objects at the different frames. In an alternative embodiment, if the standard sized object, such as a goal, basket, field markings (e.g., yard lines), does not move, then dynamic adjustment of the scale is unnecessary within a single video segment. As an example, as a player being tracked moves in a frame, a distance of the player to the soccer ball may be dynamically measured and a predetermined distance, such as 8 feet, from the soccer ball may define when the player is "in the action" or not. As the player comes within the predetermined distance, then a tag may be automatically applied to a video frame and as the player exits from the predetermined distance, that video frame may be tagged so that the video segment between the first and second tags may be identified as the player being "in the action." In an alternative embodiment, an indicator may be associated with a frame or set of frames where a player meets a criteria, and a user may manually set a tag based on the criteria having been met or not, the action happening at that time, or otherwise.

An extract video module 808 may be configured to extract video that has been identified to meet criteria or search parameters set by a user. The extract video module 808 may be configured to index the video or copy and paste video content that has been identified into a different region of memory or on a storage unit.

A video management module 810 may be configured to enable a user and/or administrator to manage video that has been uploaded. The module 810 may be configured to store video in association with respective user accounts, tag the video in a manner that allows for correlating video content captured from the same sports event, or copy the video that is determined to be captured at the same sports event into another region of memory that includes all video captured from the same respective sporting events. The video tagging may be automatic, semi-automatic, or manually tagged, as described with regard to module 820.

A video upload/download module 812 may enable the user to upload and download videos from the server. The module 812 may operate in conjunction or be integrated with the module 802. The module 812 may be configured to automatically, semi-automatically, or manually enable the user to upload and download video to and from the server. In one embodiment, the module 812 may be configured to allow for real-time or semi-real-time streaming of video to users who request real-time streaming.

A share video module 814 may enable a user to share a video with other users. In one embodiment, sharing the video with other users may provide for sharing the video with friends, family, other users (e.g., spectators) at a particular game, users within a particular group (e.g., high school football group), or otherwise. The module 814 may be configured to use search parameters from users that are used by the video processing module 806 to identify video segments or streams that include video content that match the search parameters, and cause the video segments and/or streaming video to be communicated to users searching for video segments and/or real-time streaming video content. In one embodiment, because the video content is to be processed to determine if the video content includes one or more search parameters, real-time streaming may include video content that is delayed due to processing limitations.

A social media interface module 816 they enable a user to load video captured and/or processed by a server onto social media. That is, the module 816 may enable the user to post video content from the server is his or her account or processed by the server and available to the user to one or more social networking site of the user or group (e.g., high school football fan club). In one embodiment, the module 816 may be configured to establish temporary (e.g., game), extended (e.g., season), or permanent social media networks for users to participate in recording, sourcing, requesting, and receiving video content on a real-time or non-real-time basis, as further described herein.

A synchronize videos 818 module may be utilized to enable the system to synchronize videos from multiple users. In synchronizing the videos for multiple users, if the users are all using an app that is common, then that app may utilize a real time clock to synchronize videos being captured by different users by timestamping video segments, relative clock that is set by a start of the game, or any other technique for synchronizing videos, including identifying an action (e.g., ball snap, pitch, hit, etc.) within a video and matching the same action in multiple videos. The synchronize video module 818 may be utilized by the video processing module 806.

An apply hashtags module 820 may be configured to automatically, semi-automatically, or manually apply one or more hashtags to a video content segment or clip. In applying the hashtags, a server may apply tags assigned to the video content segments by users via the apply hashtags module 722, for example, for storage in a data repository.

Figures 9, 10, 11:
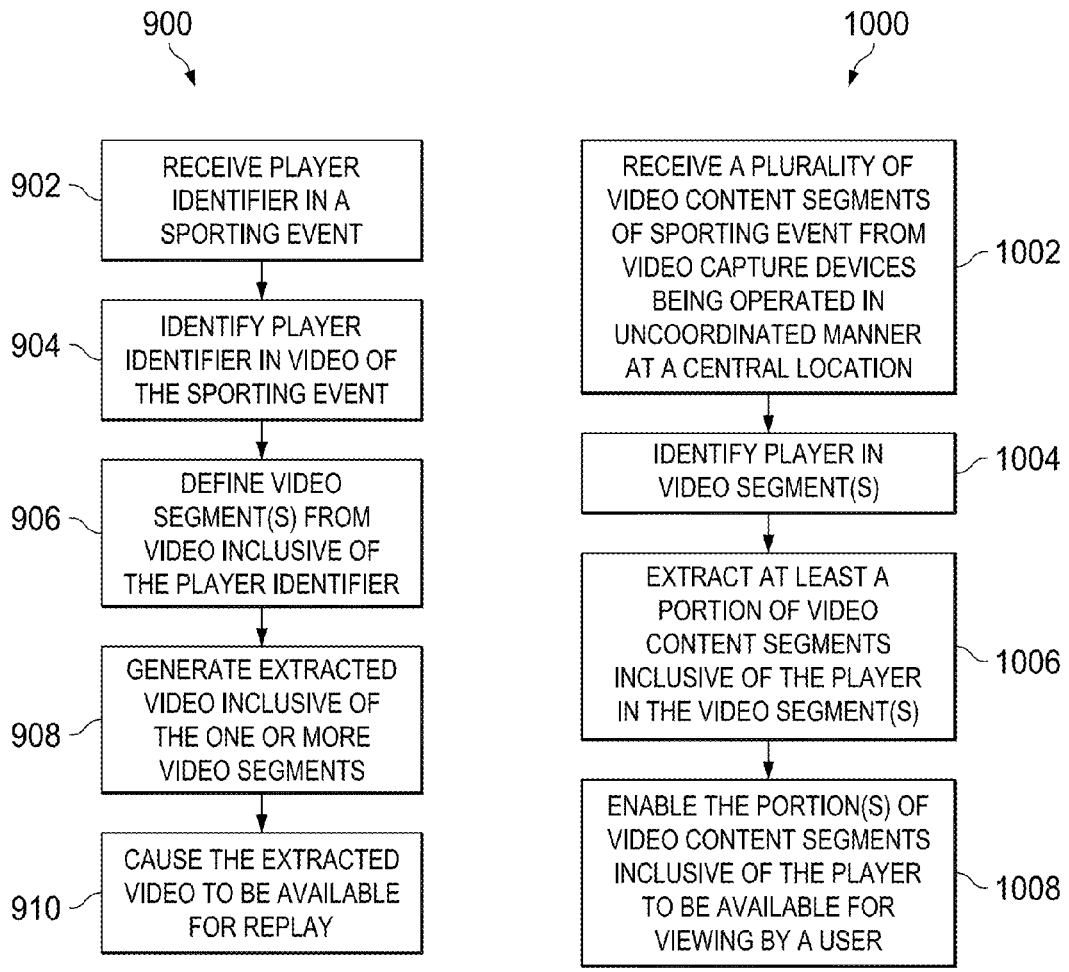
FIG. 9 is a flow diagram of an illustrative process for processing and creating an extracted video with particular search parameters.
FIG. 10 is a flow diagram of an illustrative process for crowd sourcing video content.
FIG. 11 is a flow diagram of an illustrative process used to create a video from video segments.

With regard to FIG. 9, a flow diagram of an illustrative process 900 for processing and creating an extracted video with particular parameters is shown. The process 900 may start at step at 902, where a player identifier in a sporting event is received. The player identifier may be a number on a uniform or jersey of a player that is playing in the sporting event. At step 904, the player identifier may be identified in the video of the sporting event. The number and jersey may be in color to provide for additional identification capabilities. In identifying the player identifier in the video, image processing may be utilized to inspect numbers on jerseys of the players throughout a video. In one embodiment, the image processing may identify specific colors of jerseys, thereby enabling filtering of players in a manner that avoids identifying a player with the same number on the other team. The player identifier may also have another parameter that defines the player as being in a particular position, such as offense or defense, so that when an offense of a team is on the field, and the player is on the defense, the video processing may simply skip that segment. It should be understood that player numbers and colors may be utilized, but other unique identifiers and combinations of unique identifiers may be utilized to determine player and team of the player.

At step 906, one or more video segments may be defined from video inclusive of the player identifier. In identifying the video segments, start and stop times or any other indices that identify video segments in which the player identifier is included may be used. At step 908, extracted video inclusive of the one or more video segments may be generated. The extracted video may be generated by using references to particular video segments in a single video or multiple videos, or may be a new video that includes each of the selected video segments inclusive of the player identifier. The extracted video may also include transition video segments between each of the extracted video segments that form the extracted video. At step 910, the extracted video may be caused to be available for replay. In causing the extracted video to be available for replay, the video may be available on a mobile device of a user, available on a server accessible by the user via a mobile device or other electronic device, written to and stored in a non-transitory storage medium, such as a disk, tape, or otherwise.

With regard to FIG. 10, a flow diagram of an illustrative process 1000 for crowd sourcing video content is shown. The process 1000 may start at step 1002, where multiple video content segments of a sporting event from video capture devices being operated in an uncoordinated manner may be received at a central location. In being uncoordinated, the video capture devices may be operated by users who are not centrally coordinated by a video production manager using the video to broadcast or for use by a team. The users may be fans, supporters, spectators, family, friends of the team (e.g., coaches), or even part of the team, but overall not coordinated.

At step 1004, a player in one more video segments may be identified using image processing. In identifying the player, a player identifier, such as a player number on his or her uniform, may be identified using character recognition or other image processing technique. In one embodiment, if a player is indicated as being on a particular team, a team jersey may be identified by colors (e.g., white jersey with blue writing on the jersey). If the player is identified in a video segment, indices, markers, pointers, timestamps, or any other computer implemented indicator that defines a start and end of the video segment inclusive of the player may be utilized.

At step 1006 at least a portion of video content segments inclusive of the player in the video segments may be extracted. In extracting the video, the indices, markers, pointers, timestamps, or other computer implemented indicator being used to identify a start and end of a video segment may be stored in an array or other memory configuration. In response to a user requesting to play the video segment(s), the identified video segments as identified by the indices may be played, while unmarked video segments may be skipped. The video extraction may also include identifying one or more tags with video content segments in which a player is or is not included, and those tagged video content segments may be extracted for inclusion in a video. Alternatively, copies of the marked segments may be copied into a different storage or memory area so that a new video including the video segments may assembled into an extracted video.

At step 1008, at least a portion of the video content segments inclusive of the queried player (i.e., the player matching a submitted identifier as a search parameter) may be enabled for the user to view. In one embodiment, enabling the video content to be available for a user to view may include enabling the user to view the video content via a mobile device or may be written on a non-transitory memory device, such as a DVD, or downloadable via a website, online store, or otherwise.

With regard to FIG. 11, a flow diagram of an illustrative process 1100 used to create a video from video segments is shown. The process 1100 may start at step 1102, where video segments or indices that define video segments from videos of sporting events may be received. At step 1104, video inclusive of the video segments is created. Each of the video segments include a player in the video content that meet or are tagged with input search parameters, such as duration of time near a ball, performing a certain play, at a certain location, in the video segment for a certain amount of time, or otherwise. The extracted or composite video may be created by including transition segments between the video segments. It should be understood that the creation of a video may include generating a list of computer pointers, tags, and/or timestamps that enable a computer to access video content without copying or assembling a new composite video.

Figure 12B:
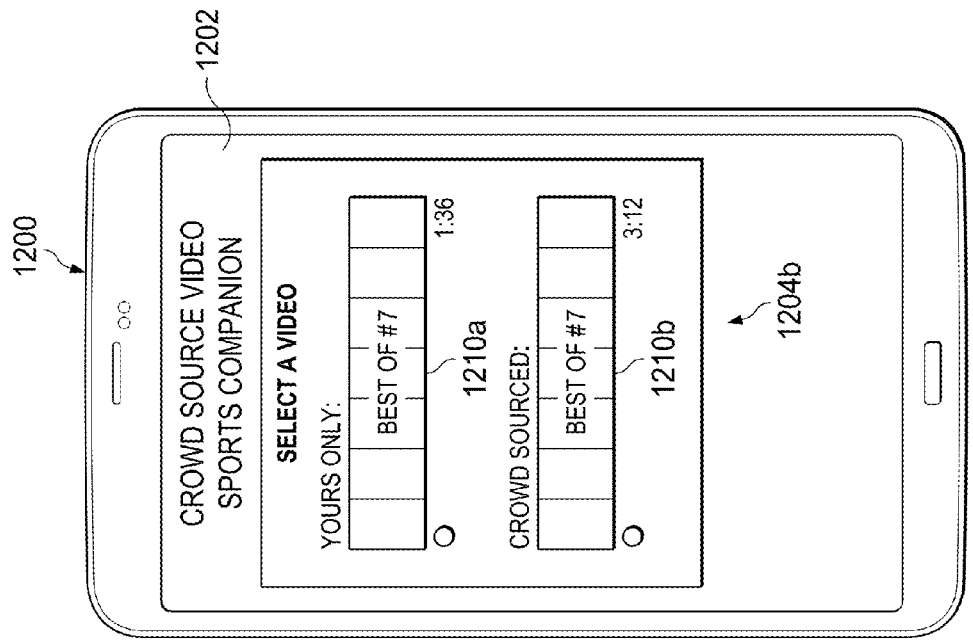
FIGS. 12A and 12B is an illustration of a video capture device, such as a smart phone, that includes an electronic display to be executing an application for capturing and creating extracted video based on one or more search parameters.
Figure 12A:
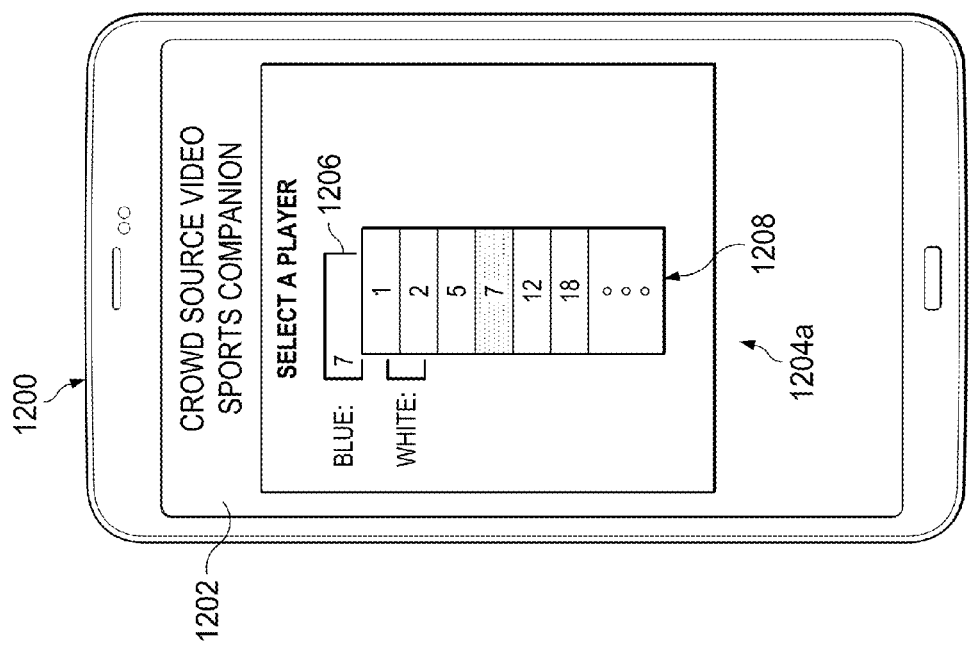

With regard to FIGS. 12A and 12B, an illustration of a video capture device 1200, such as a smart phone, that includes an electronic display 1202 is shown. In FIG. 12A, the video capture device 1200 may utilize a processing unit (not shown) to execute an application or user interface (e.g., website) that supports capturing and creating extracted video based on one or more input search parameters. The video capture device 1200 may identify video content inclusive of content that satisfies the input parameter(s) in generating the extracted video. After capturing video, the video capture device 1200 may provide a user with a user interface 1204a that enables the user to select a player based on an identifier, such as a number, on the player's uniform. As shown, a user interface element 1206 may be selected by the user, and a selectable list 1208 may provide the user with player numbers identified within video segments captured by the video capture device 1200. Alternatively, rather than listing number limited to players on a team, all numbers 0-99 may be available for selection of a number matching a player. In this instance, the user selected player number 7.

In FIG. 12B, user interface 1204b presents two videos that match the user's input criteria to create an extracted video limited to only those video clips with player number "7." As shown, (i) extracted video 1210a created from only video that the user recorded is available for playing and (ii) extracted video 1210b that includes video of the player number "7" that was crowd sourced (i.e., video submitted by the user and any other user at the same game who submitted video for some or all the users to search with input parameters to create an extracted video).

Figure 13:
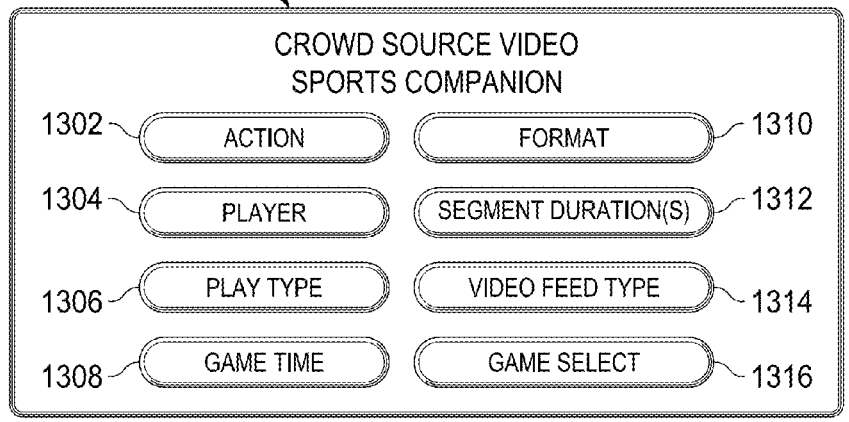
FIG. 13 is a screenshot of an illustrative user interface that provides for selecting a particular action, player, play type, and/or other parameters from a user's or crowd sourced video of a sporting event.

With regard to FIG. 13, a screenshot of an illustrative user interface 1300 is shown. The user interface 1300 provides for a number of different parameter inputs for the system to use in searching video content to identify video segments that satisfy the input parameters. As shown, an "action" soft-button 1302, "player" soft-button 1304, "play type" soft-button 1306, "game time" soft-button 1308, "format" soft-button 1310, "segment duration" soft-button 1312, "video feed type" soft-button 1314, "game select" soft-button 1316 are available for a user to select. It should be understood that additional and/or alternative soft-buttons may be provided on the user interface 1300, as well.

The "action" soft-button 1302 may enable a user to select video segments in which action or particular actions are occurring. For example, the user may be able to select or set a type of action, such as an action in which a player is within a certain distance of a ball, front of a race, or otherwise. In selecting actions, pre-established tags may be applied by crowd edited as described herein and applied to video content segments.

The "player" soft-button 1304 enables the user to select a particular player on a respective team. For example, the user may select a player number on the uniform of a player, such as shown in FIG. 12A. Other configurations for selecting a player may be utilized, including enabling the user to view a still image from a video and select a player shown in the image using a touchscreen or otherwise.

The "play type" soft-button 1306 may enable a user to request a particular type of play from a particular type of sport. For example, if the sport is baseball, then the user may be able to select with the player catches the ball, throws a pitch, is at bat, steals a base, or any other play. Other sports, such as lacrosse, may have different types of plays, such as scoring a goal, preventing a goal from being scored, making a pass, catching or throwing the ball, or otherwise.

The "game time" soft-button 1308 may be used to enable the user to request video content that matches game time (e.g., 43:07 minutes), actual time (e.g., 10:18 am), or segment of a game (e.g., 4th quarter). To enact such a search feature, one embodiment may apply actual time or relative game time to received video content, if known, so that a user may select specific time frames to identify and extract video segments.

The "format" soft-button 1310 may enable the user to select a particular format that he or she wants to receive or view and extracted video inclusive of content that satisfies the input parameters. For example, the format selection may enable downloading to a mobile device, posting to the website, writing onto a tangible memory device, or otherwise.

The "segment durations" soft-button 1312 may enable the user to select one or more durations of time for each video segment to extend. For example, the user may select that only video segments having a minimum of about five seconds (e.g., 4.80 seconds or higher) of desired video content be identified and extracted.

The "video feed type" soft-button 1314 may enable a user to select a video feed type, such as "instant replay" or "live feed." If, for example, "instant replay" is selected, then real-time notifications may be sent and/or video delivery may be communicated to the user of the mobile device. An instant replay enables the user to access video, via either a pull or push communication mode, being collected from other users who are participating in a temporary social network established at the game or event. As further described herein, the user may also select to access video content including certain search parameters, for example, from other games. By being able to access video so that a parent with two or more children playing in different games at different locations can see instant replays (or real-time streaming) of their children when identified using search parameters by a search system.

The "game select" soft-button 1316 may enable to search for and/or select games that are being played in a local area or more broadly in other geographic areas. The search may include the system providing a list of selectable games that are geographically sorted, alphabetically sorted, game start sorted, or keyword searchable, as understood in the art.

Figure 14A:
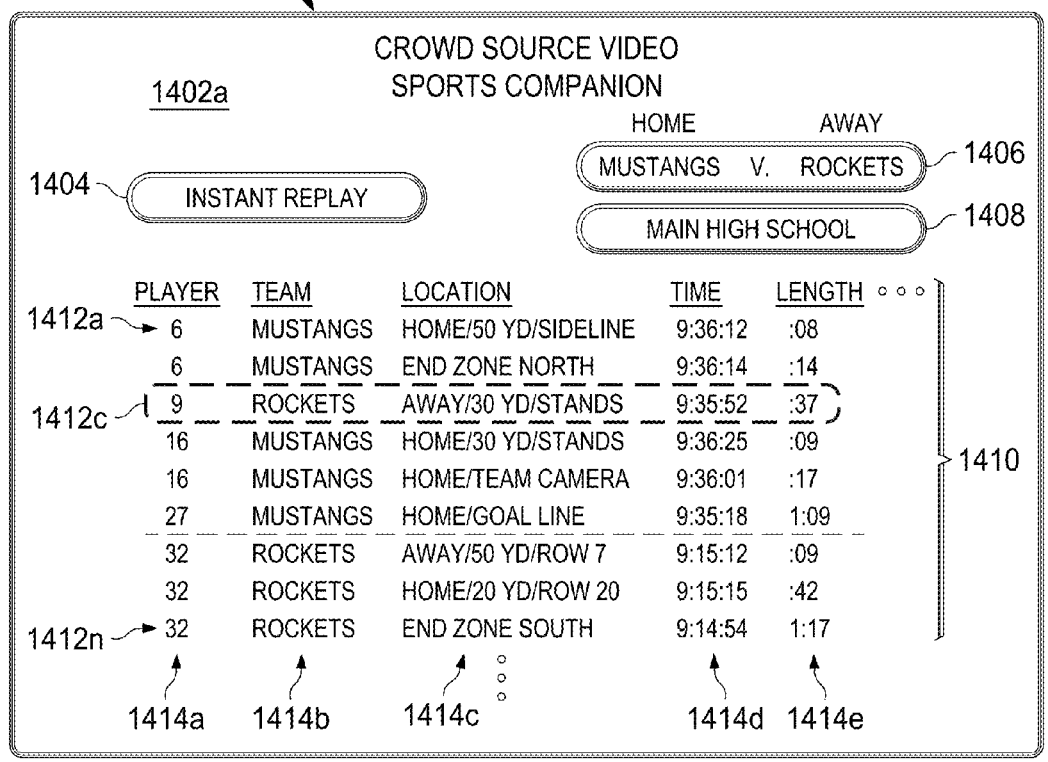
FIG. 14A is an illustration of a video capture device or other electronic device that may be configured to display an illustrative graphical user interface inclusive of videos captured by a spectator and available for instant replay.

With regard to FIG. 14A, an illustration of a video capture device or other electronic device 1400 may be configured to display a graphical user interface 1402. The video capture device 1400 is to be wirelessly networked to a remote server configured to receive, process, and communicate video. The graphical user interface 1402 may be generated by an application or mobile app being executed by the video capture device 1400 or be driven by a remote electronic device, such as a server via a communications network (e.g., mobile network, Internet, and/or local via a wireless communications link that is local to a sports playing field at which the user operating the video capture device 1400 is located).

The graphical user interface 1402 includes a selection soft-button 1404 to select a video feed type, such as "instant replay." A user may select the soft-button 1404 to select another type of video feed, such as "live stream."

A "current game" soft-button 1406 may show a current game or event being presented in the user interface 1402, and may be selectable to enable the user to select another game from which to receive instant replay video segments. A "location" soft-button 1408 may show a current location at which the game is being played. The soft-button 1408 may be selectable to enable the user to select other locations of games from which to select.

A table 1410 of available and selectable video segment links 1412a-1412n (collectively 1412) is shown. The video segment links 1412 may be hyperlinks and used to send a request to download respective video content. In one embodiment, the links 1412 may include thumbnail or other images associated therewith. The table 1410 may include a number of different fields, including player 1414a, team 1414b, location 1414c, time 1414d, and video segment length 1414e. It should be understood that alternative and/or additional fields associated with video segments may be available, as well. As shown, the table 1410 is sorted by player number. It should be understood that the table 1410 may be sorted by any of the other fields or combination of fields (e.g., player 1414a first, video segment length 1414e second). As shown, the location provides specific location of a user at the game. As an example, a user may be located on the home team side, 50 yard line, at the sideline. Alternatively, the user may be located on the away team side, 30 yard line, in the stands. More granular location information may also be available, such as north side of the 50 yard line, south side of the 50 yard line, row number, section number, or any other location identifier or descriptor.

In one embodiment, when a user checks into a game, which may be set up as a temporary social media event, the user may be provided with a number of different input parameters that he or she may enter or select to identify his or her specific location at the game so that other users at the game or remotely located from the game can know where the user is located when recording the video. Alternatively, image processing may be utilized to automatically determine location and/or angle of a user relative to a field or other sports venue (e.g., determine alignment relative to 50-yard line). As shown, each video segment identified includes a player number that is identified within the video segment. If multiple players are identified within a video segment, then multiple listings for the same video segment may be shown, but associated with different players. By presenting the data in this matter, a user may select a single player to view and filter out other players or have the ability to see all players and what video segments are available from different angles including different start times and having different video segment lengths. Rather than all of the available video segments being listed, the user may establish a filter to limit the listing only to those video segments that meet search parameters. In one embodiment, the video content segments may be listed according to angle versus time for a user to select desired video content segments.

Because the table 1410 is meant to provide users or spectators with instant replays, the video segments may be processed in real-time and posted in real-time to be available for selection by the users so that the user may watch the instant replay video segments at an appropriate time (e.g., just after a play occurred or during a referee meeting to determine whether a call was correct). The list 1410 may be ordered in a time sequential order so that past plays may also be available for watching. In response to a user selecting one of the video segment links 1412, such as video segment link 1412c, the user interface 1402 may transition into a video player, such as that shown in FIG. 14C. In one embodiment, a video segment may be recorded or converted to be slow motion or fast motion and an identifier indicative of that video format may be listed in association with the video segments.

Figure 14B:
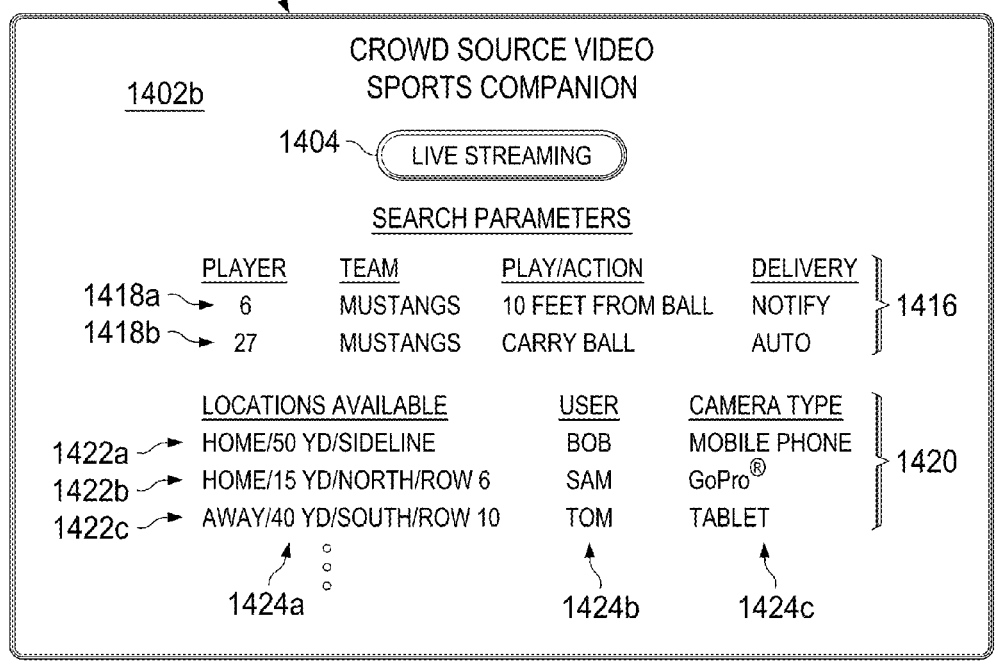
FIG. 14B is an illustration of the video recording device displaying a user interface, where the user has selectably changed the view from an "instant replay" view to a "live streaming" view by selecting the video feed type soft-button.

With regard to FIG. 14B, an illustration of the video recording device 1400 is showing to be displaying a user interface 1402b, where the user has selectably changed the view from an "instant replay" view to a "live streaming" view by selecting the video feed type soft-button 1404. The user interface 1402b enables the user to select search parameters, such as those shown in table 1416, where the user may select and enter a player, team, play/action, and delivery. As shown, the user has entered two sets of search parameters 1418a and 1418b. In the first set of search parameters 1418a, the user has selected player number "6," team name, action type of where the player is 10 feet or less from the ball, and video delivery, where a notification delivery may include displaying a video segment that matches the search parameters to be posted to a list for the user to view or any other type of message notification that enables the user to select and download video content, as understood in the art. If the user selects an automatic delivery, then in response to a particular set of search parameters occurring and being identified as occurring, then a video segment that matches the search parameter may be automatically in a list, streamed, or otherwise delivered to the video recording device 1400. In one embodiment, the video segments may automatically be displayed on the video recording device, such as in a video viewer as provided in FIG. 14C. Another list 1420 may enable a user to select from a set of live streaming sources 1422a-1422c that lists locations 1424a, users 1424b, and camera types 1424c from which to select by a user.

Figure 14C:
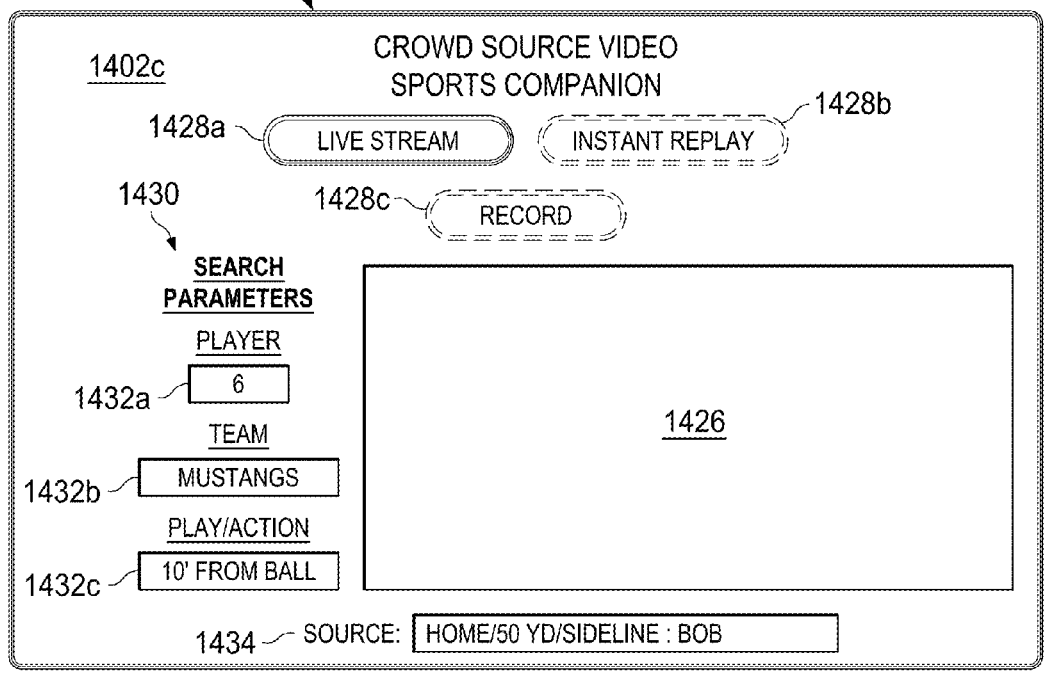
FIG. 14C is an illustration of the video recording device presenting user interface, where the user interface includes a video display region for video content to be displayed.

With regard to FIG. 14C, is an illustration of the video recording device 1400 presenting the user interface 1402c, where the user interface 1402c includes a video display region 1426 for video content to be displayed. The user interface 1402c may include a "live stream" soft-button 1428a and "instant replay" soft-button 1428b that may be selectable by the user to select whether he or she wants to watch live streaming or an instant replay, respectively. A "record" soft-button 1428c may enable a user to start recording new video content without having to leave the user interface 1402c.

In one embodiment, currently set search parameters 1430 may be displayed and selectable for the user to alter the search parameters 1430. For example, the user may be able to select a player search parameter 1432a to change player number, team search parameter 1432b for the user to change teams, and play/action search parameter 1432c to change the play or action search parameter. It should be understood that additional and/or alternative search parameters, such as tags, may be displayed or displayable for the user to view and alter, as desired. A source data field 1434 may display a current source from which video being displayed in the video display region 1426 is being viewed. The user may select the source data field 1434 to select a different source of video content to be displayed in the video display region 1426. For the live streaming 1428a, data that is being collected from any video capturing device at the game using an application that is set up for a temporary social network may communicate data being captured via a communications network to a server that collects, processes, and distributes the video content to the video capturing devices, and are part of the temporary social network in a real-time manner. With further regard to FIG. 2, in the event that the user has set up a live stream delivery, then the server 206 may communicate the live stream 210 for distribution to video capture devices 106 that request the live stream of any other video capture device 106. It should be understood that the live stream may be operative without having a search parameter being met, but rather operate more as a peer-to-peer communication where one fan is able to see a video feed from another fan. In one embodiment, a verification process may be used to confirm that the video feed is being sourced from a playing field, where a playing field may be any area at which a sporting event is played, such as a pool, basketball court, track, football field, etc. The confirmation of the video feed being sourced from a playing field may include identifying at least one feature of a playing field, such as grass, to avoid a fan distributing undesirable video content to another fan. Moreover, one embodiment may include a human curator or editor to review video content prior to distribution of the video content.

In the event that the user has selected the "instant replay" soft-button 1428*b*, content that is displayed or displayable in the video display region 1426 may not be streamed, but rather downloadable and pushed to the device 1400 for selection, unless requested to be automatically displayed, as described with regard to FIG. 14B, and viewed.

The system may be configured to establish certain relationships between a player and activity. For example, the system may be configured to automatically identify and tag when the player is (i) a certain distance from a ball (e.g., soccer ball), (ii) in a particular stance (e.g., in a batting stance, on the ground (in the case of a slide tackle in soccer)), (iii) traveling at a certain speed (e.g., for race car driving or other sports in which speed is a factor), (iv) in a particular position (e.g., off the ground, near a basket, near a goal, in a crease, near another player, near a sideline, in a batter's box), (v) in a scene for a certain period of time (e.g., 5 seconds), (vi) at a certain distance from a camera, or otherwise so that specific actions by the player or other criteria can be searched. Alternatively, and as described herein, crowd edited tagging of video content segments may be performed in a manual and/or semi-automatic manner (e.g., computer performs a first pass or filtering and user confirms or modifies tags).

In recording the video, standard video cameras, mobile imaging devices (e.g., mobile phones, tablets, GoPro cameras, etc.) may be used and the video footage may be accessed by an editing/playback system capable of being executed on cameras to perform the various identification functions described above. Alternatively, the video footage may be loaded into separate or remote (e.g., on a server via a communications network) system that executes a software system that processes the image data independent of the video cameras. In the case of the software system being resident on the camera, tagging or identification of the specific players in captured video may be performed in real-time. Alternatively, the tagging or identification of the specific players in the captured video may be performed post-video capture.

For capturing the video, one or more cameras may be used. If multiple cameras are used, the cameras may be synched, or software being executed by both cameras may be remotely synched, such that real-time or relative time between the cameras may be established. In the case of using real-time, real-time clock data may be recorded and associated with one or more video frames so that video from different camera angles may be collected and available to a user who wants to watch a player from different angles. For example, in the case of football, cameras may be placed on opposing goal posts and at an announcers' box. Handheld cameras, including mobile devices, may also be used. Because only one of the goal post cameras will capture the number of the player at each lineup in which the player participates, the other two camera angles may never capture the number of the player, and the software system may not be able to tag or identify the video frames in which the player is participating. However, because video from one of the multiple cameras is able to be used to identify that the player is in the scene and the videos can be synched (at least the times at which the videos are captured can be identified), then the video captured from each of the cameras may be tagged or identified as containing the player. In an alternative embodiment, the cameras may simply be cameras used by fans, and video content may be uploaded to a system that identifies players by numbers on their uniforms and uses tracking software, as understood in the art, to track the players.

If multiple cameras are used to capture video from different video angles, a user may select a video that provides for the best image of the unique identifier (e.g., player number), such as a complete number over a partial number. The selected video can be used in identifying the player. If the videos are synched, then the system may automatically identify the same player in each of the different videos from the different angles. In one embodiment, the system may be automated to identify the video with the best view of the player identifier.

In an embodiment, a system may create a set of video playable segments in which a player's number is identified (e.g., at the start of a play or video segment in which the player appears) using character recognition. The set of video segments may be thumbnails that may be selected using touch or other features to enable the user to view the video segments. In addition, the video segments may be formed into a single video with or without transition segments (e.g., fade-to-black) between the video segments. An editing system may also enable a user to simply drag, select, or otherwise cause the video segment or a selectable portion thereof to be inserted into or at the end of a continuous video using video editing techniques, as understood in the art. In an alternative embodiment, the system may be automated and follow input parameters for content to comply, and, if so, the steadiest, longest, brightest, clearest, sharpest, or other image parameters may establish which video segment from multiple video segments of the same play at different angles should be selected. The video segments may be associated with actual time and/or game time.

In an embodiment, the system may enable a user to select a zoom level for video inclusive of a player wearing a selected unique identifier. The zoom level may be selected from multiple, predetermined selectable zoom levels. Alternatively, a dynamic zoom level may be set by a user, and the system may maintain that zoom level.

In another embodiment, the system may enable a user to select a crop distance surrounding a player wearing a selected unique identifier. The crop distance may be selected from multiple, predetermined selectable crop distances. Alternatively, a dynamic crop distance may be set by a user, and the system may maintain that crop distance surrounding the player.

Access to the video system may be via the camera (if configured with the video processing system), cloud via a website, or local computer. The software may be native or a downloadable app.

Figure 15:
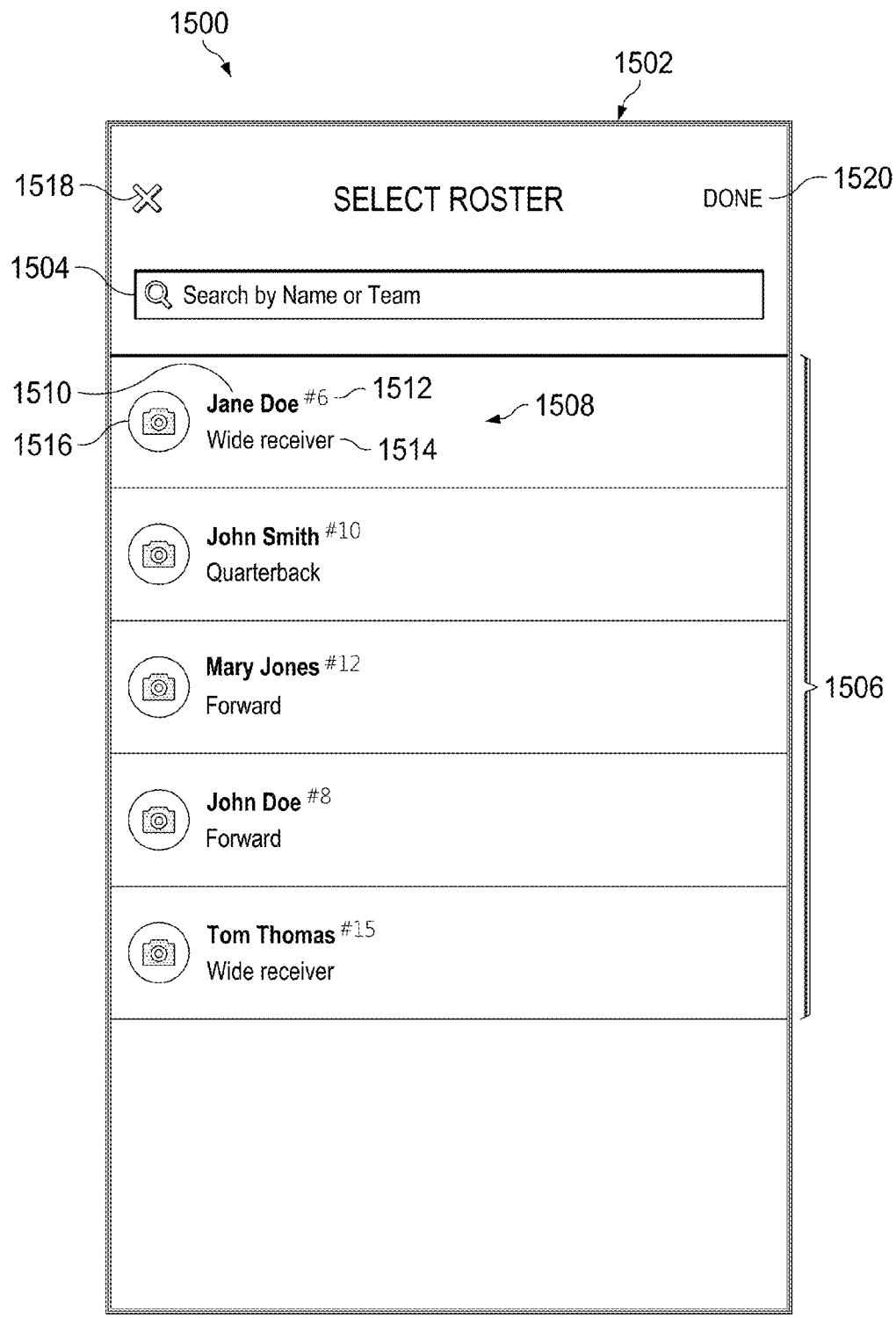
FIG. 15 is a screenshot of an illustrative user interface for a coach to sign-up and select a roster for the team.

With regard to FIG. 15, a screenshot of an illustrative user interface 1500 for a coach to sign-up and select a roster for the team is shown. The user interface 1500 is shown to include a "select roster" window 1502, in which a coach of a team may perform a search to search a data repository for a player name or team name to identify players to include on a team roster. A team roster 1506 may be shown as the coach identifies players on a team. As an example, a player item 1508 includes a player name 1510, player number 1512, player position 1514, and selectable photo element 1516 in which the coach may select and enter a photo of the player. In one embodiment, the coach may select and/or enter the player number and player position using the user interface 1500. As shown, the select roster window 1502 may enable the coach to cancel select in the roster using a cancel soft-button 1518 or select a "done" soft-button 1520 upon completion of selecting the roster.

Figure 16:
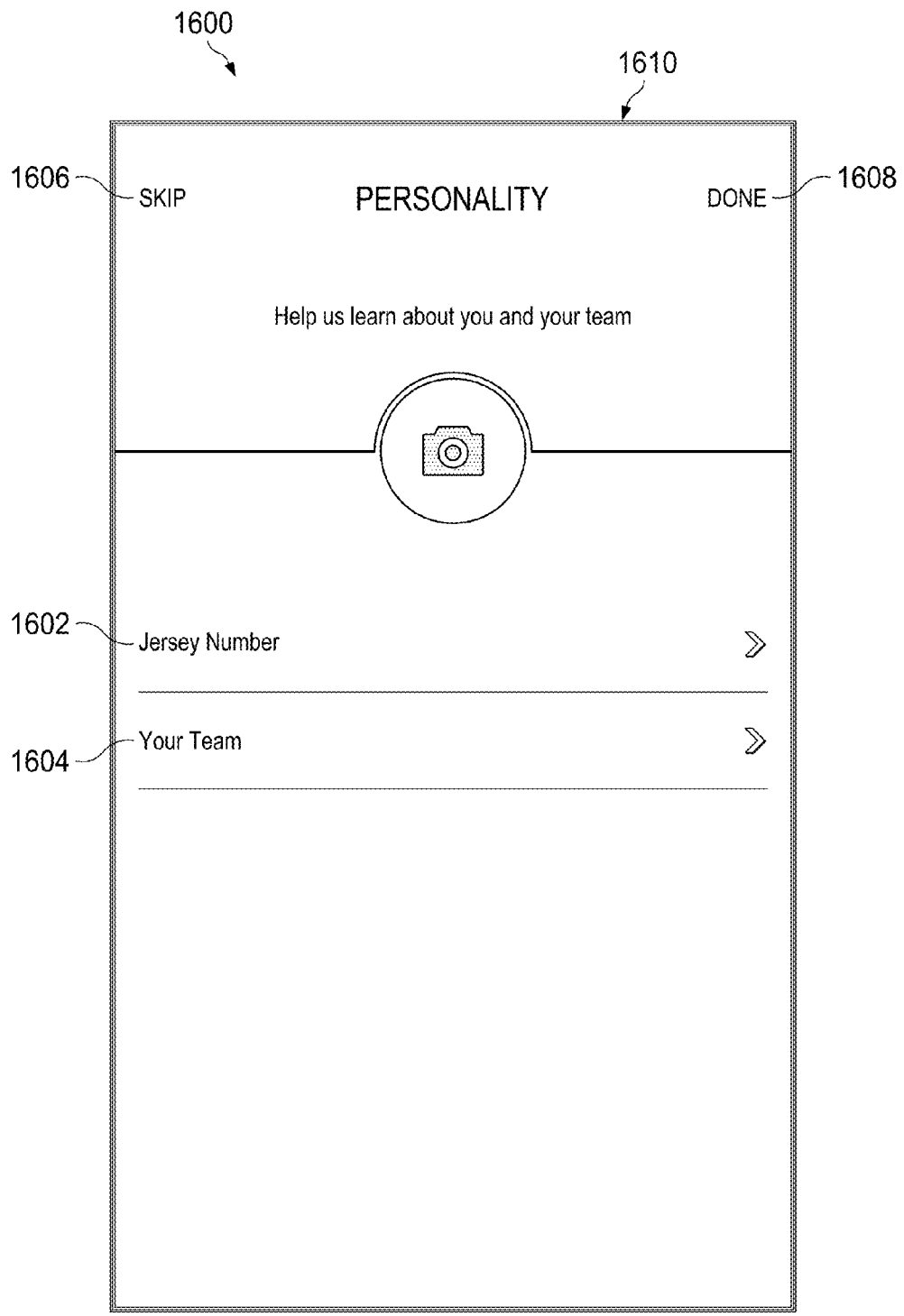
FIG. 16 is a screenshot of an illustrative user interface for a player to sign-up and select or submit player information, including jersey number and team name via respective user interface input elements.

With regard to FIG. 16, a screenshot of an illustrative user interface 1600 for a player to sign-up and select or submit player information, including jersey number and team name via respective user interface input elements 1602 and 1604 is shown. The player or athlete may elect to skip submitting the information using a "skip" soft-button 1606 or submit the information by selecting a "done" soft-button 1608 within a window or region 1610.

Figure 17:
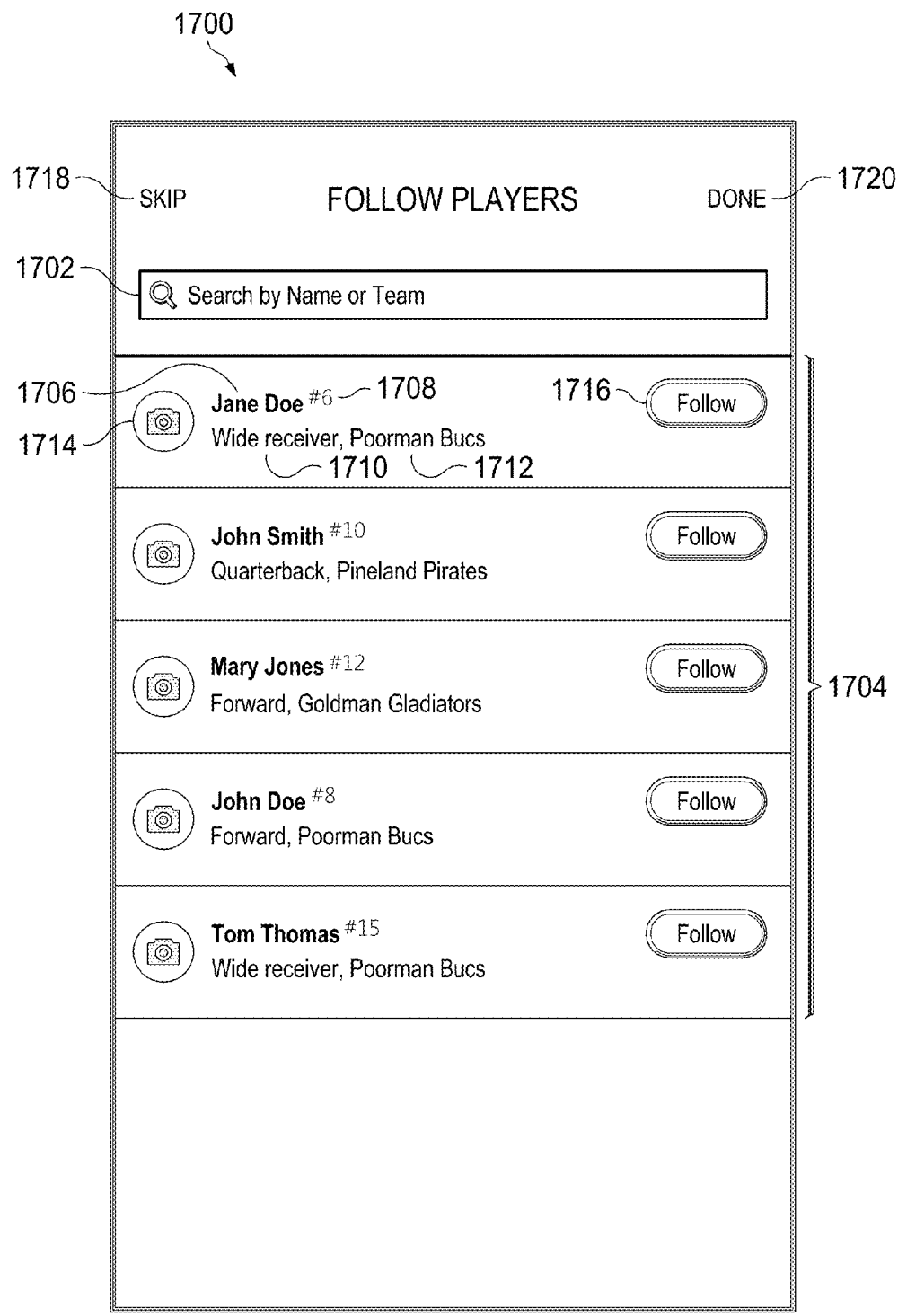
FIG. 17 is a screenshot of an illustrative user interface for a fan or other user to sign-up and select player(s) to follow.

With regard to FIG. 17, a screenshot of an illustrative user interface 1700 for a fan or other user to sign-up and select player(s) to follow is shown. The user interface may include a text entry box 1702 for a user to enter a player name or team to cause a list 1704 of players to be displayed. Rather than using a text entry box 1702, other graphical user interface element(s) may be provided to the fan to locate a player or list of players. Each player record may include a player name 1706, player number 1708 on the player's jersey, position 1710 of the player, team 1712 of the player, photo 1714 of the player, and "follow" soft-button 1716 for the user to selectively follow the respective player. The user interface 1700 may also provide a "skip" soft-button 1718 to enable the user not to follow any players and "done" soft-button 1720 to enable the user to initiate following the selected players. In one embodiment, the "follow" soft-button may change colors or names (e.g., "following," "stop following," etc.).

Figure 18A:
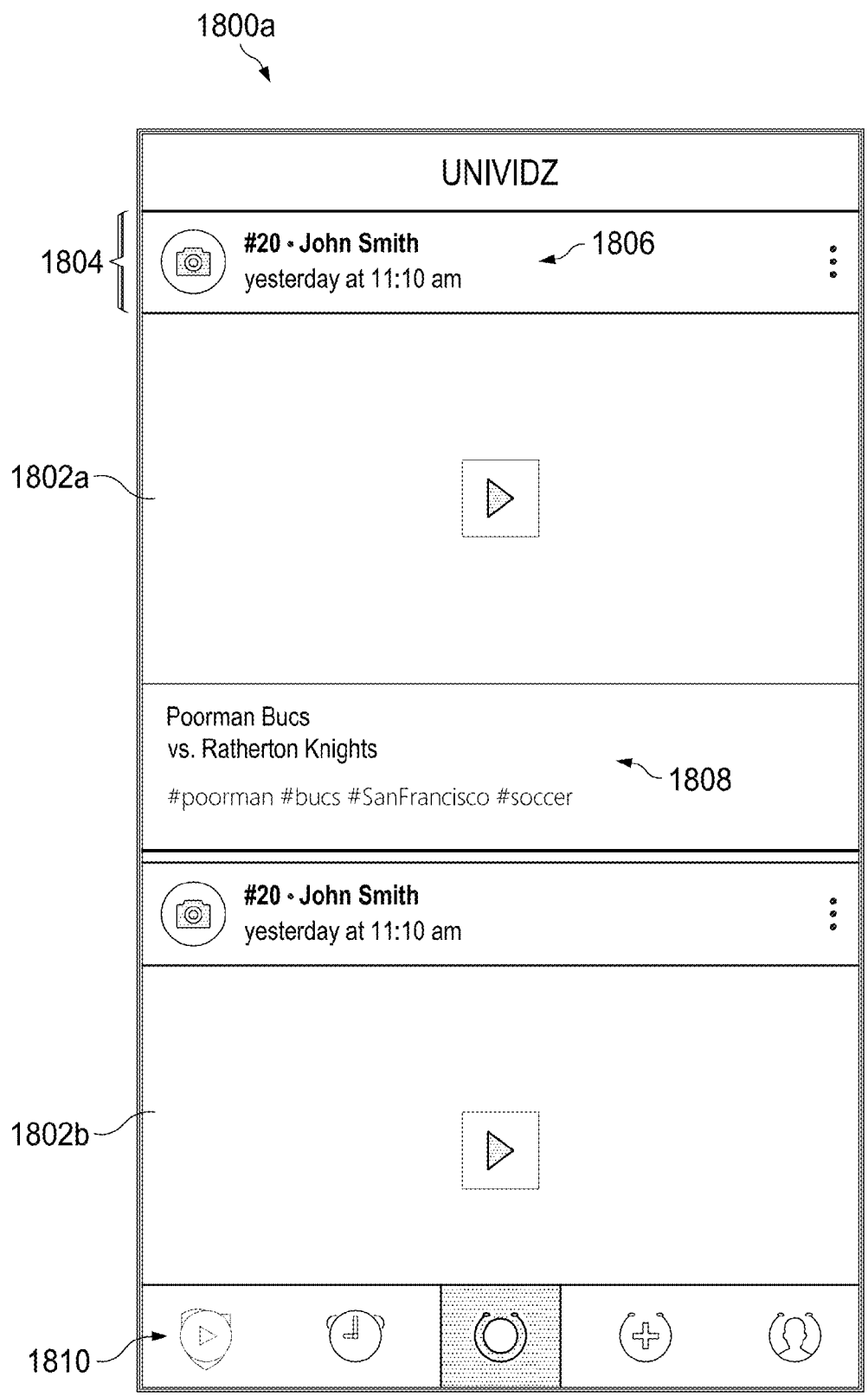
FIG. 18A is a screen shot of an illustrative user interface inclusive of illustrative video feeds are shown to enable a user to view one or more videos of a player captured during a sporting event.

With regard to FIG. 18A, a screen shot of an illustrative user interface 1800a inclusive of illustrative video feeds 1802a and 1802b are shown to enable a user to view one or more videos of a player captured during a sporting event are shown. The video feeds 1802 may be real-time or non-real-time videos that are available for a user to view. The user interface 1800 includes an information section 1804 that shows information 1806, including player number, player name, time of video capture, photo of player, etc. Additional information 1808 may include team names and game (e.g., names of teams playing one another), location of game or event, etc. Control elements 1810 may provide for a play video soft-button, time of video, add video soft-button, an so on.

Figure 18B:
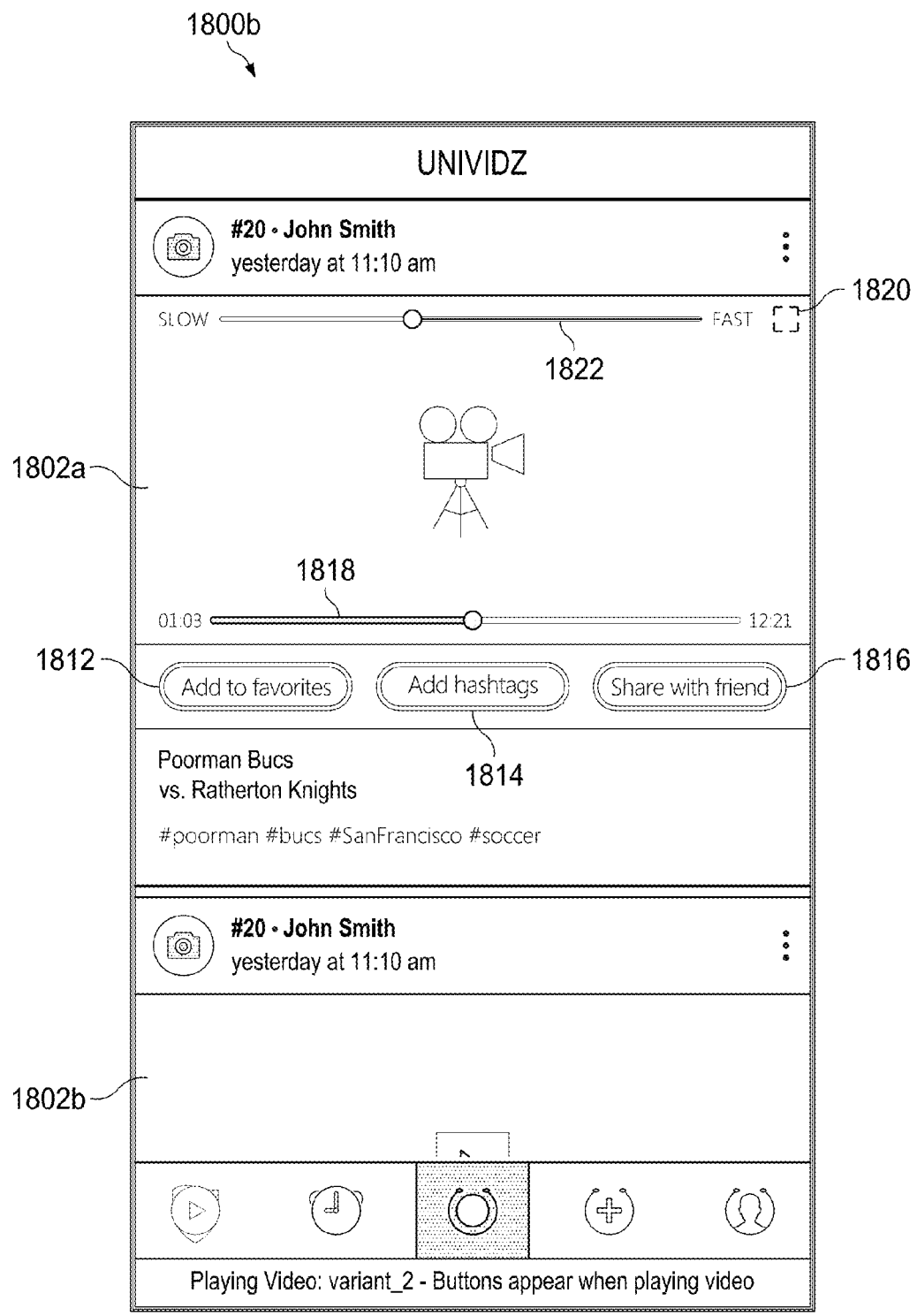
FIG. 18B is a screen shot of an illustrative user interface inclusive of the video feeds of FIG. 18A.

With regard to FIG. 18B, a screen shot of an illustrative user interface 1800b inclusive of the video feeds 1802a and 1802b of FIG. 18A are shown. An "add to favorites" soft-button 1812 allows for a user to add the video feed 1802a to a favorite video list. An "add hashtags" soft-button 1814 enables a user to add hashtag(s) to the video in the video feed 1802a. A "share with friends" soft-button 1816 enables the user to share the video with friends or family of the user. The video feed may include other conventional controls, including time control element 1818, full screen control element 1820, and zoom control element 1822. Other control elements may be provided to a user, as well.

Figure 19:
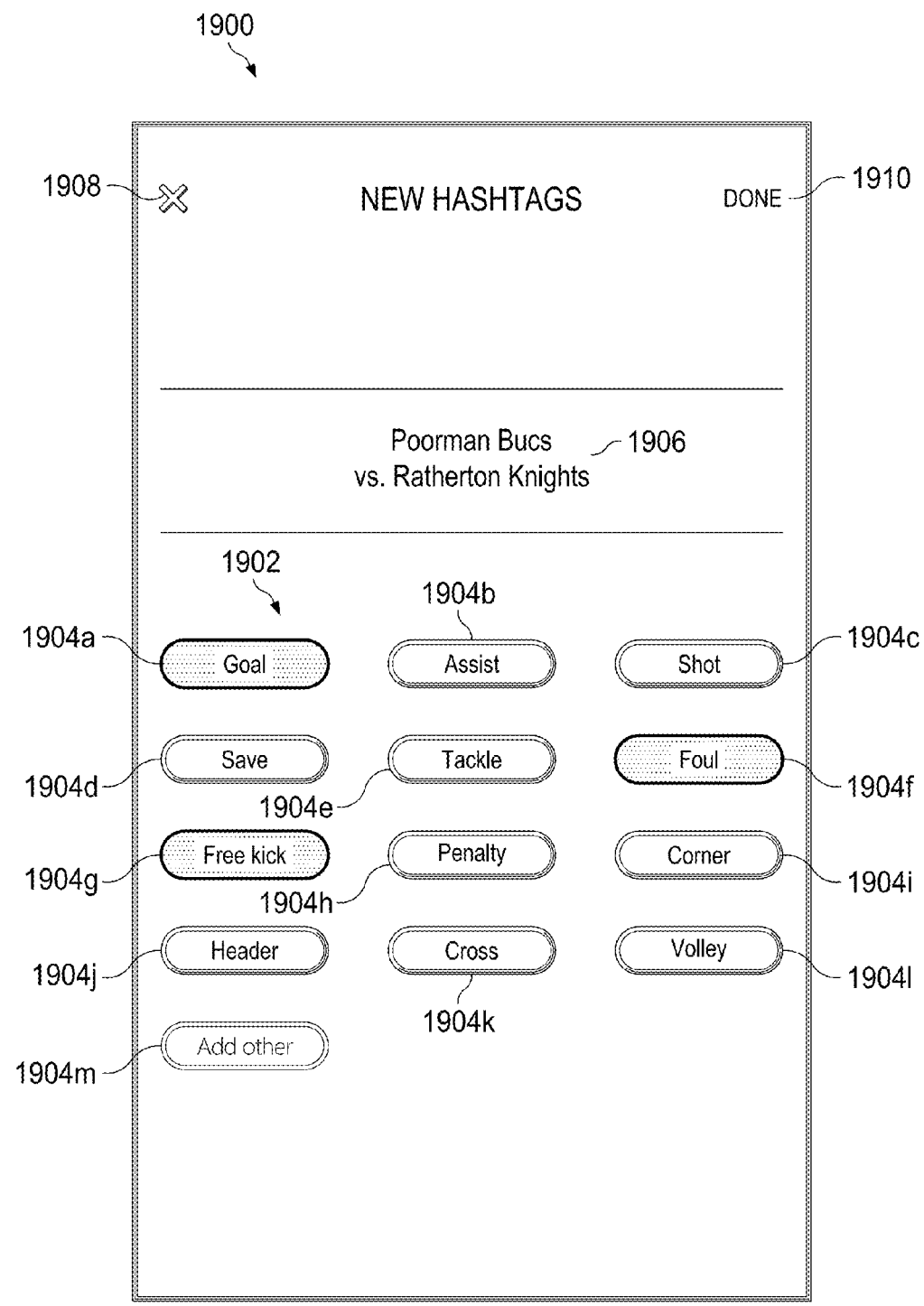
FIG. 19 is a screen shot of an illustrative user interface that enables a user to assign one or more hashtags to a video segment or clip.

With regard to FIG. 19, a screen shot of an illustrative user interface 1900 that enables a user to assign one or more hashtags to a video segment or clip is shown. A list of hashtag soft-buttons 1902 is shown to have respective hashtags 1904a-1904m (collectively 1904) that may be assigned to a video segment may be specific actions performed during a soccer game. It should be understood that the list 1902 may alternatively be defined with hashtags for any sport or activity. As shown, the hashtags 1904 may include "goal," "assist," "shot," "save," "tackle," "foul," "free kick," "penalty," "corner," "header," "cross," "volley," and "add other." By assigning one or more of the hashtags 1904 to the video, users may search for one or more hashtags, and one or more players, to identify videos of interest. Each user may assign one or more hashtags to a video segment such that a combination of the unique hashtags define each of the actions or items in the video segment. The hashtags assigned by each of the users may be a subset of a complete set of hashtags formed by a combination of unique hashtags assigned by all of the users.

The user interface 1900 may also including a name of a game 1906 associated with the video segment, cancel soft-button 1908, and "done" soft-button 1910 to accept the assignment(s) of the hashtag(s) 1904 to the video segment. Assigning hashtags by users operates as a crowd editing function in that one or more viewers may assign the hashtags to video segments collected by users, thereby enabling users to collect video of players at a sporting event and each of the users to access video from each of the participating users.

Figure 20A:
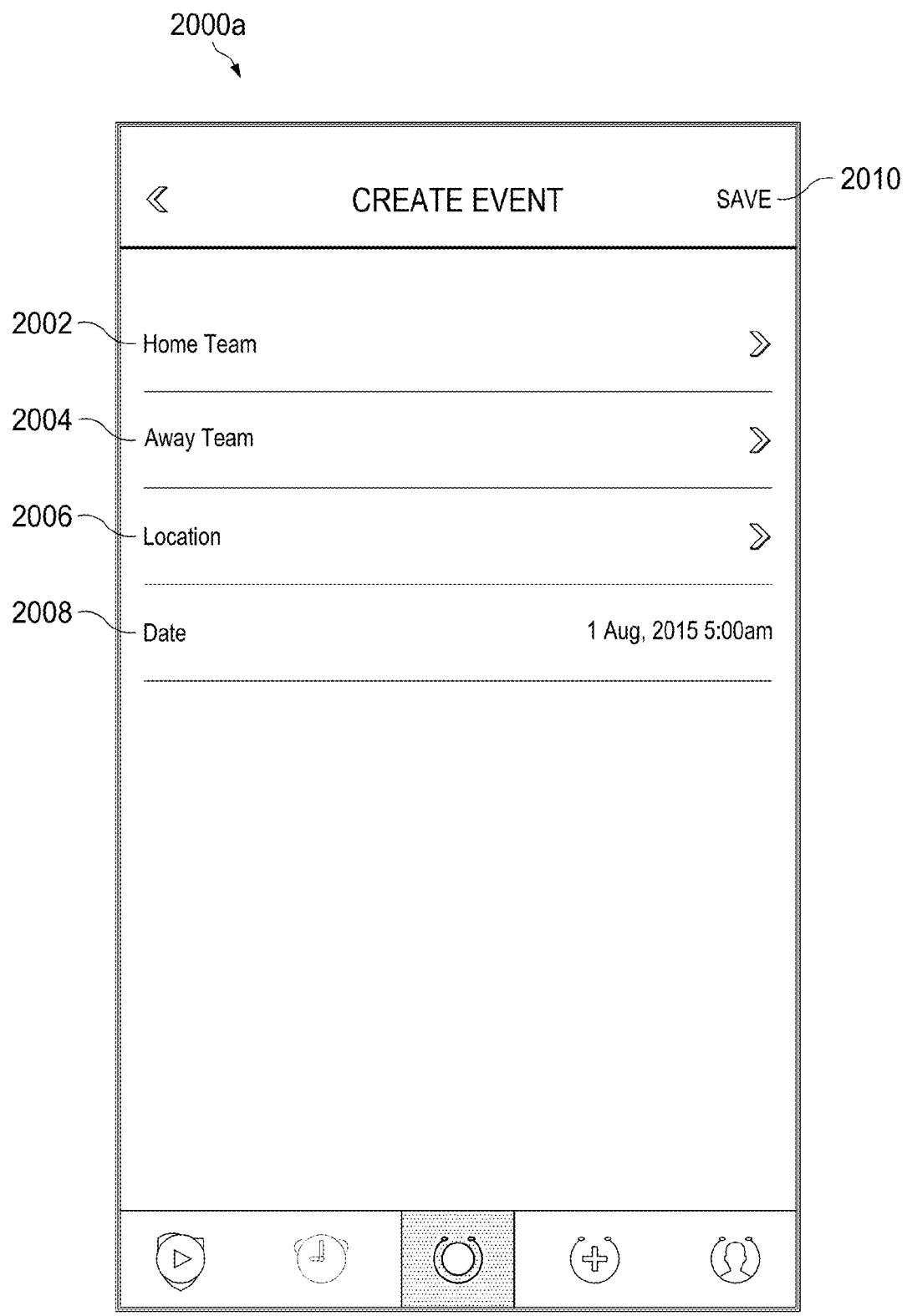
FIGS. 20A-20F are screen shots of an illustrative user interface is shown to enable a user to create an event, such as a soccer game.
Figure 20B:
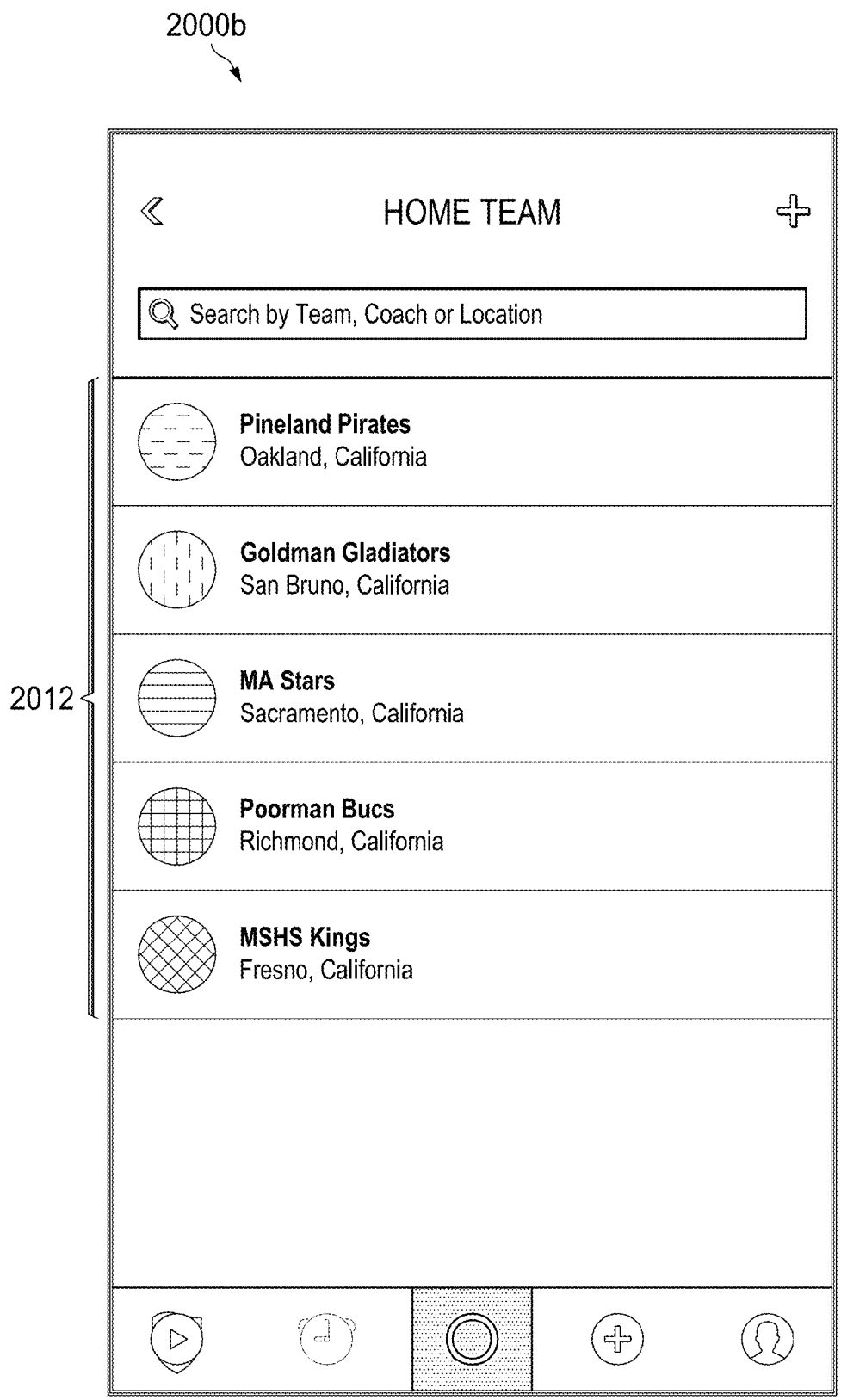
Figure 20C:
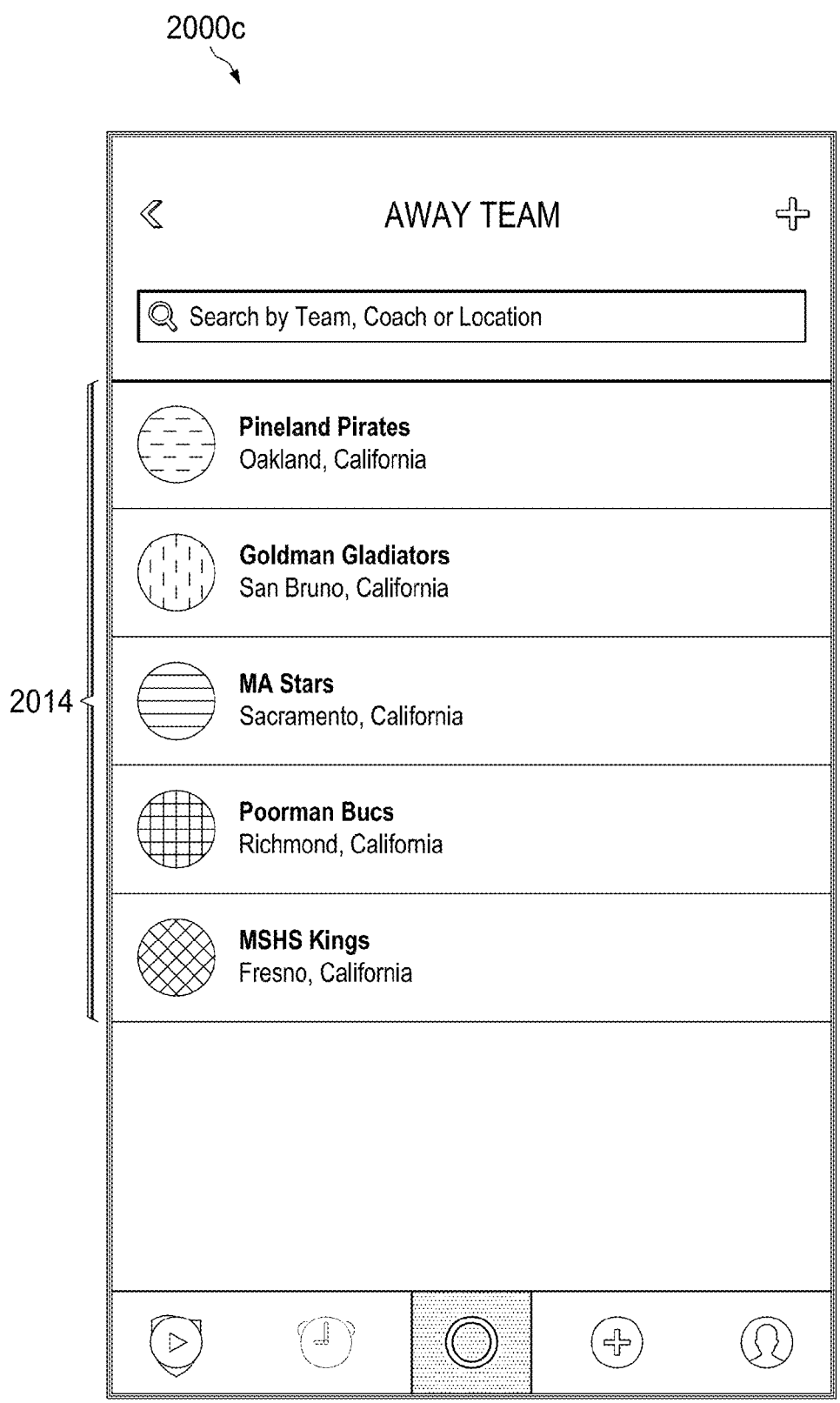
Figure 20D:
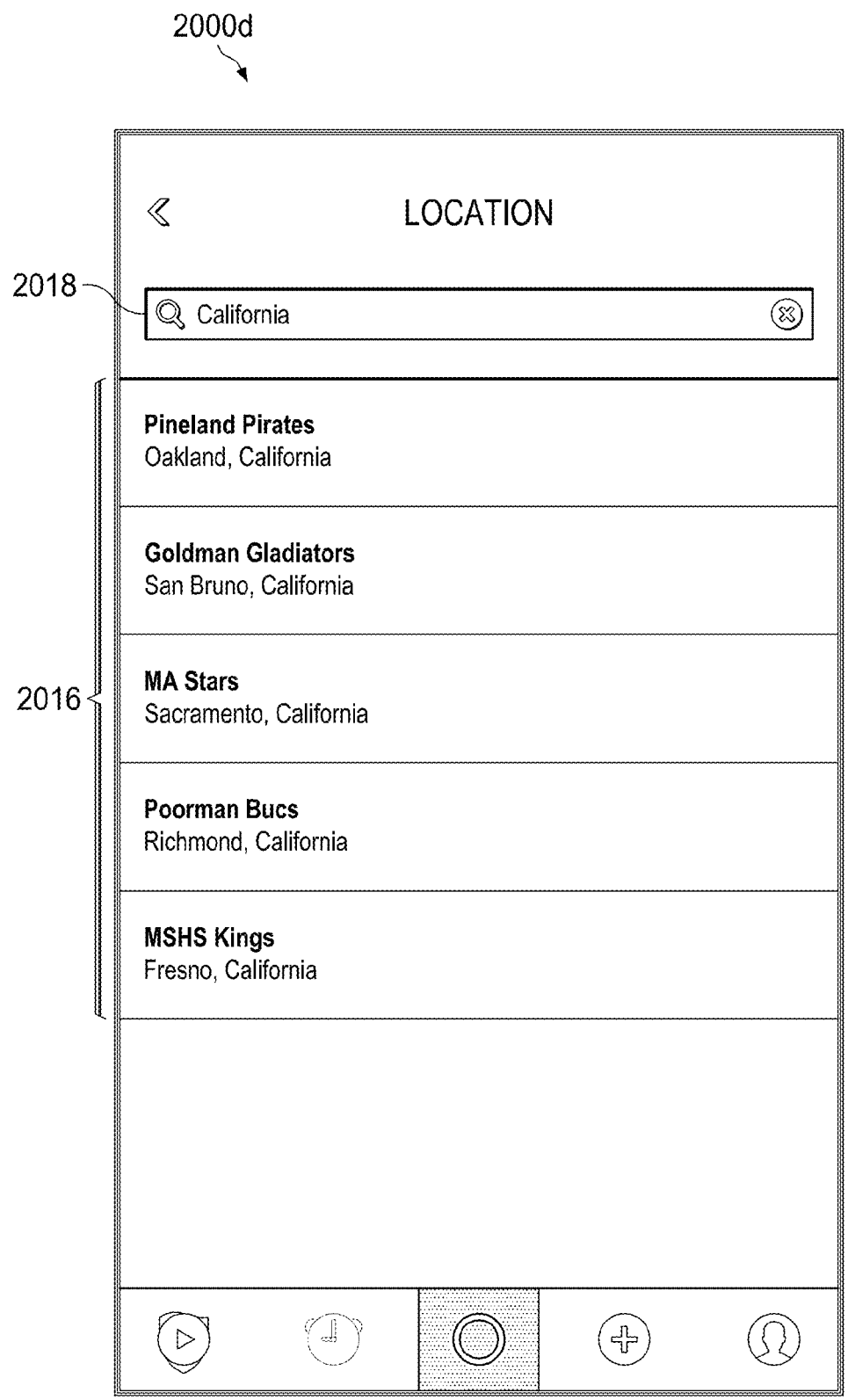
Figure 20E:
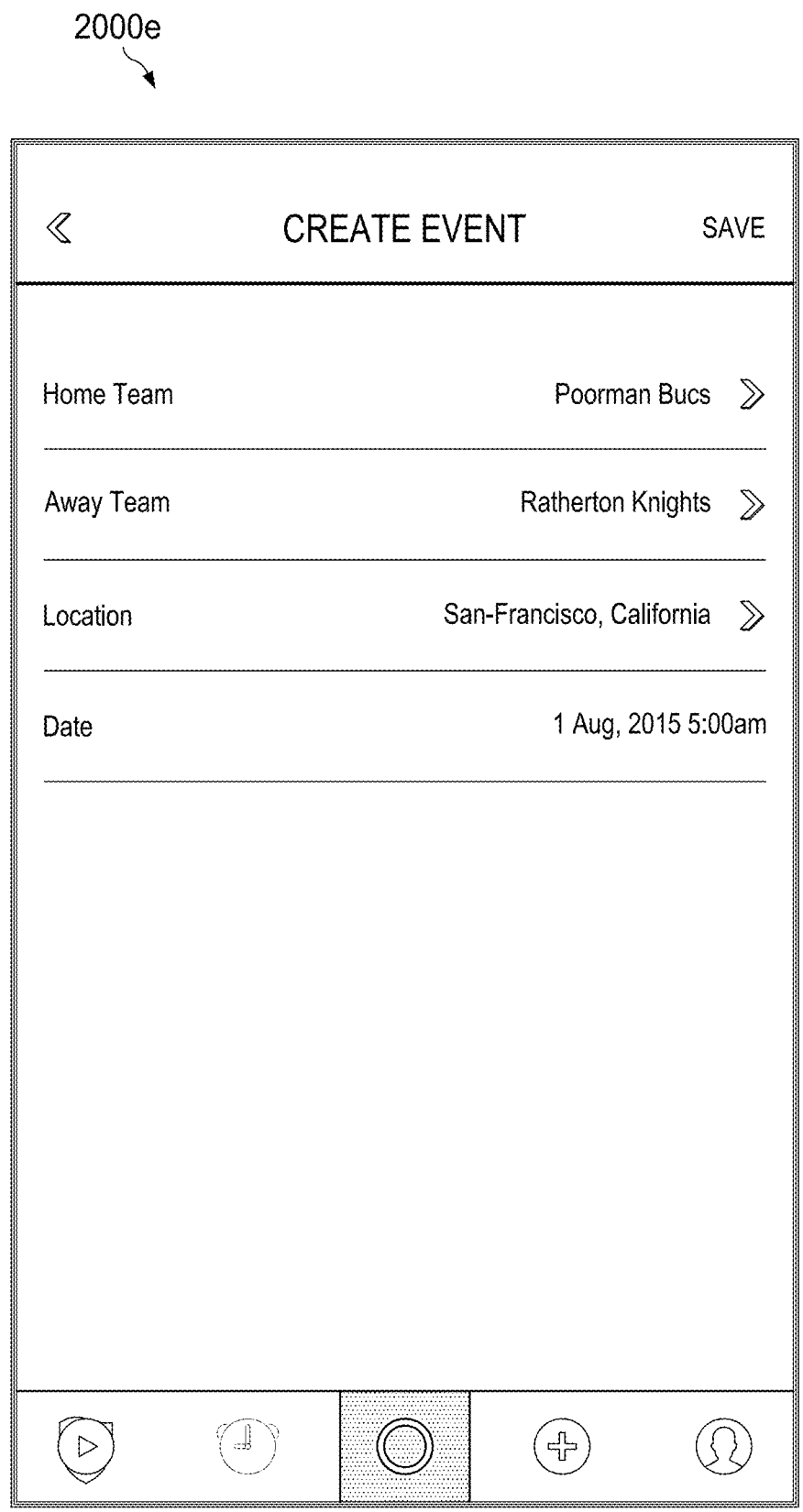
Figure 20F:
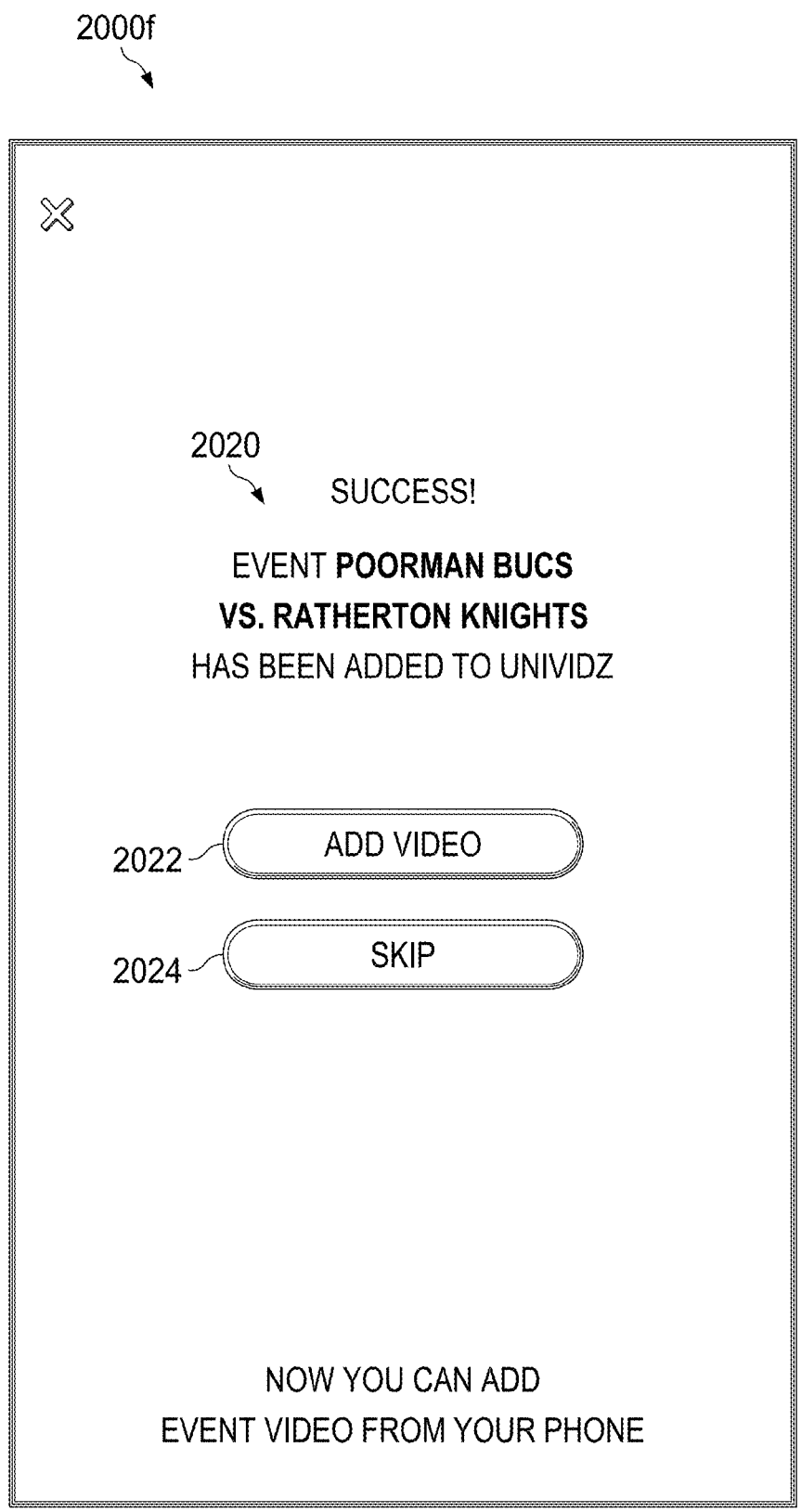

With regard to FIG. 20A, a screen shot of an illustrative user interface 2000a is shown to enable a user to create an event, such as a soccer game. The user may be a coach, parent, fan, spectator, organizer, or otherwise. The event may be any event type established for creation by an operator of the system. As shown, the user interface 2000a may include a "home team" selection element 2002, "away team" selection element 2004, "location" selection element 2006, and "date" selection element 2008. Selection of the selection elements 2002 and 2004 may provide for a user interface 2000b with a list of teams 2012 (FIG. 20B) and user interface 2000c with a list of teams 2014 (FIG. 20C) available for selection of home and away teams, respectively, by the user. Alternative listings, such as locations (e.g., towns, schools, etc.) league(s), from which the user may browse to find the home and away teams may be provided, as well. A selection of the "location" selection element 2006 may enable the user to select from a list of locations. In one embodiment, a GPS location of a mobile device on which the user interface 2000a is being executed may provide a reduced list of locations (e.g., fields) at which games may be available for selection. A user interface 2000d is shown to include a list of locations 2016 at which an event is to be held may be available for selection. The user interface 2000d may also include a text entry field 2018 may enable a user to enter a location to narrow a search for the location of the event. Once the event items are selected, as shown on the user interface 2000e in FIG. 20E, the user may select a "save" soft-button 2010 for entry of the event. The event may be selected by the user and other users for interfacing with the system thereafter. As shown in FIG. 20F, a user interface 2000f may display a message 2020 that notifies the user that the event has been added, and the user may select an "add video" soft-button 2022 to add a video from the event or "skip" soft-button 2024 to skip adding video at the event. It should be understood that a variety of different information may be presented based on the event type or other factor.

Figure 21A:
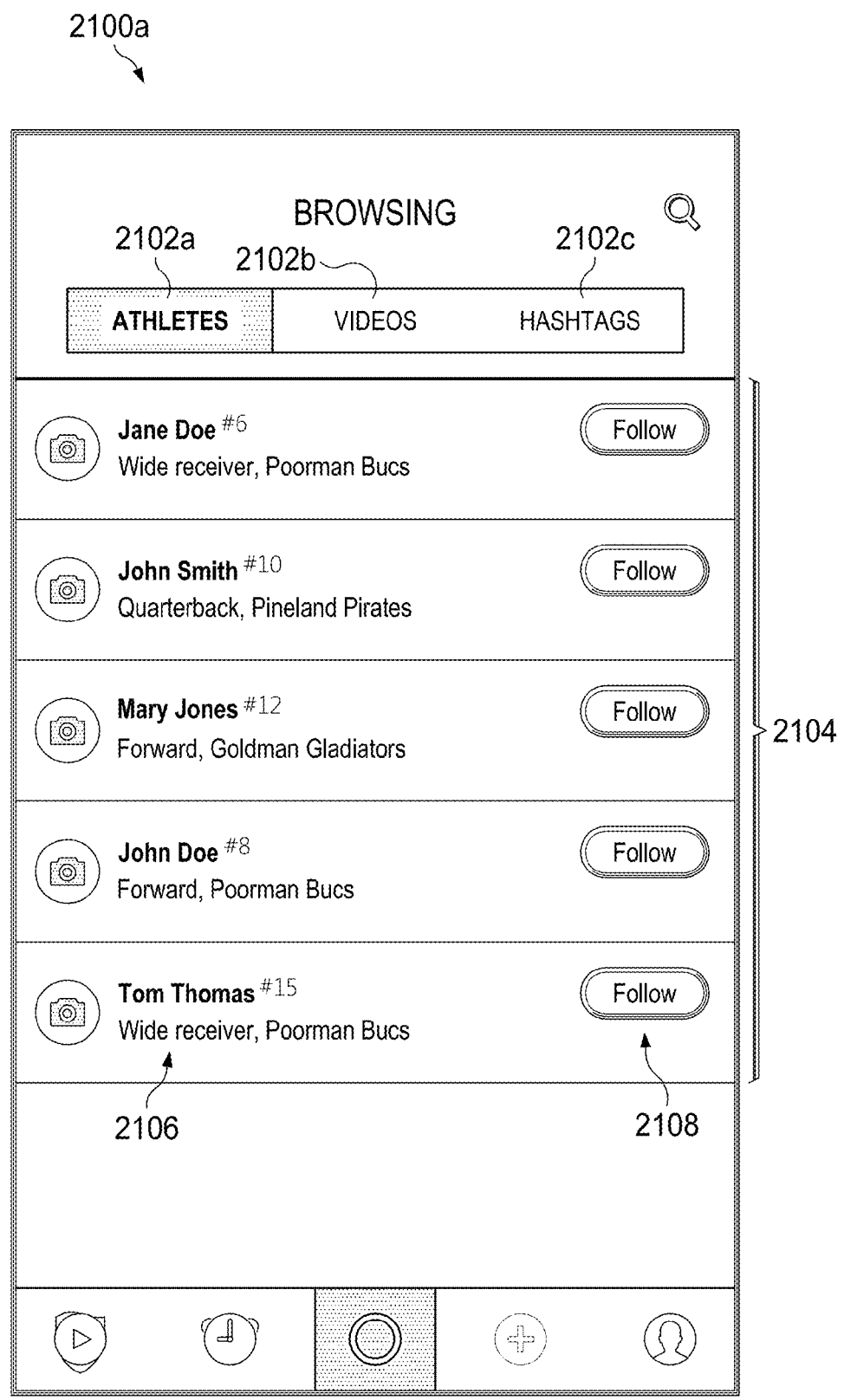
FIGS. 21A-21C are screenshots of an illustrative user interface that may provide for a user to browse content collected at one or more events by selecting an "athletes" soft-button, "videos" soft-button, and "hashtags" soft-button.
Figure 21B:
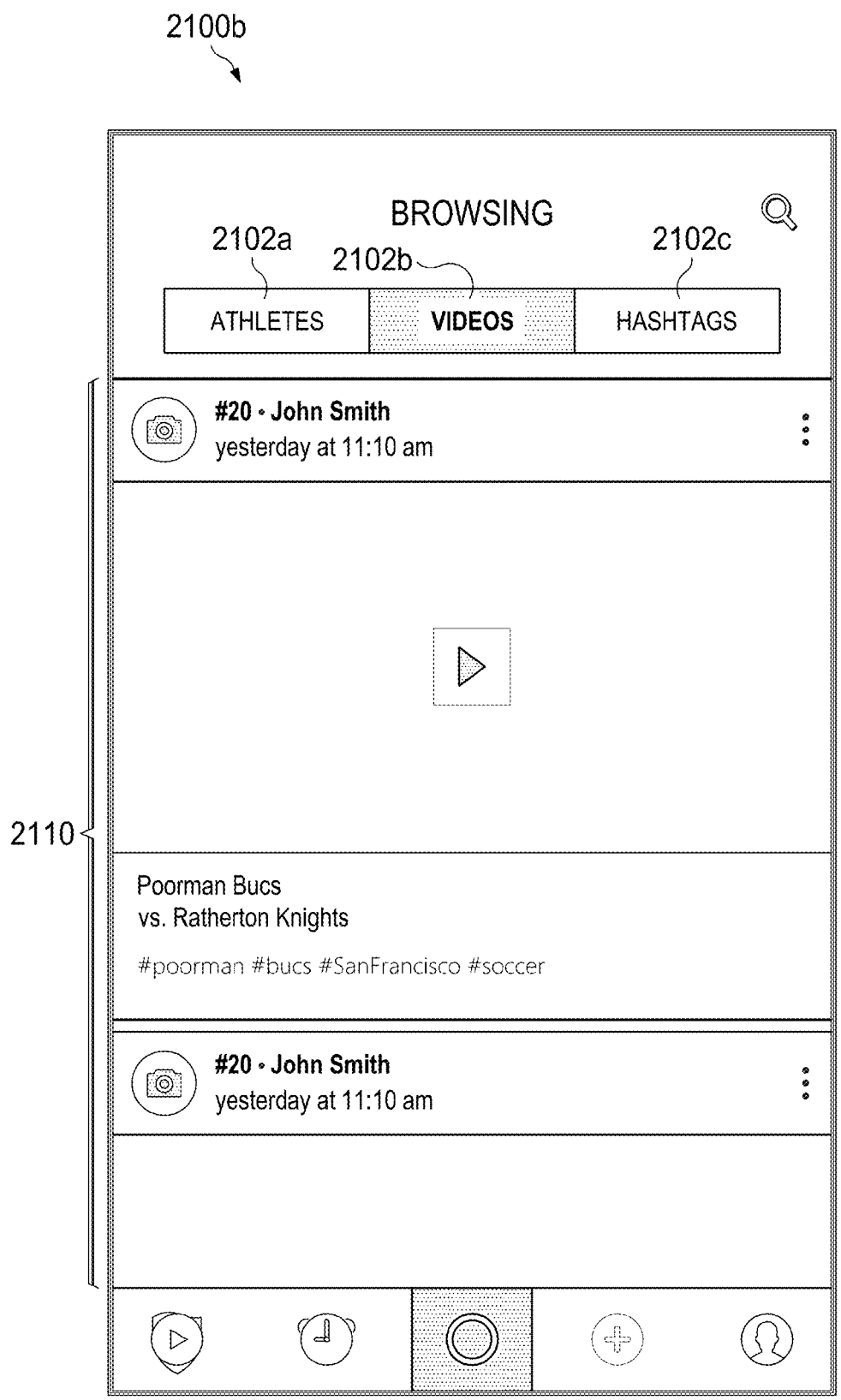
Figure 21C:
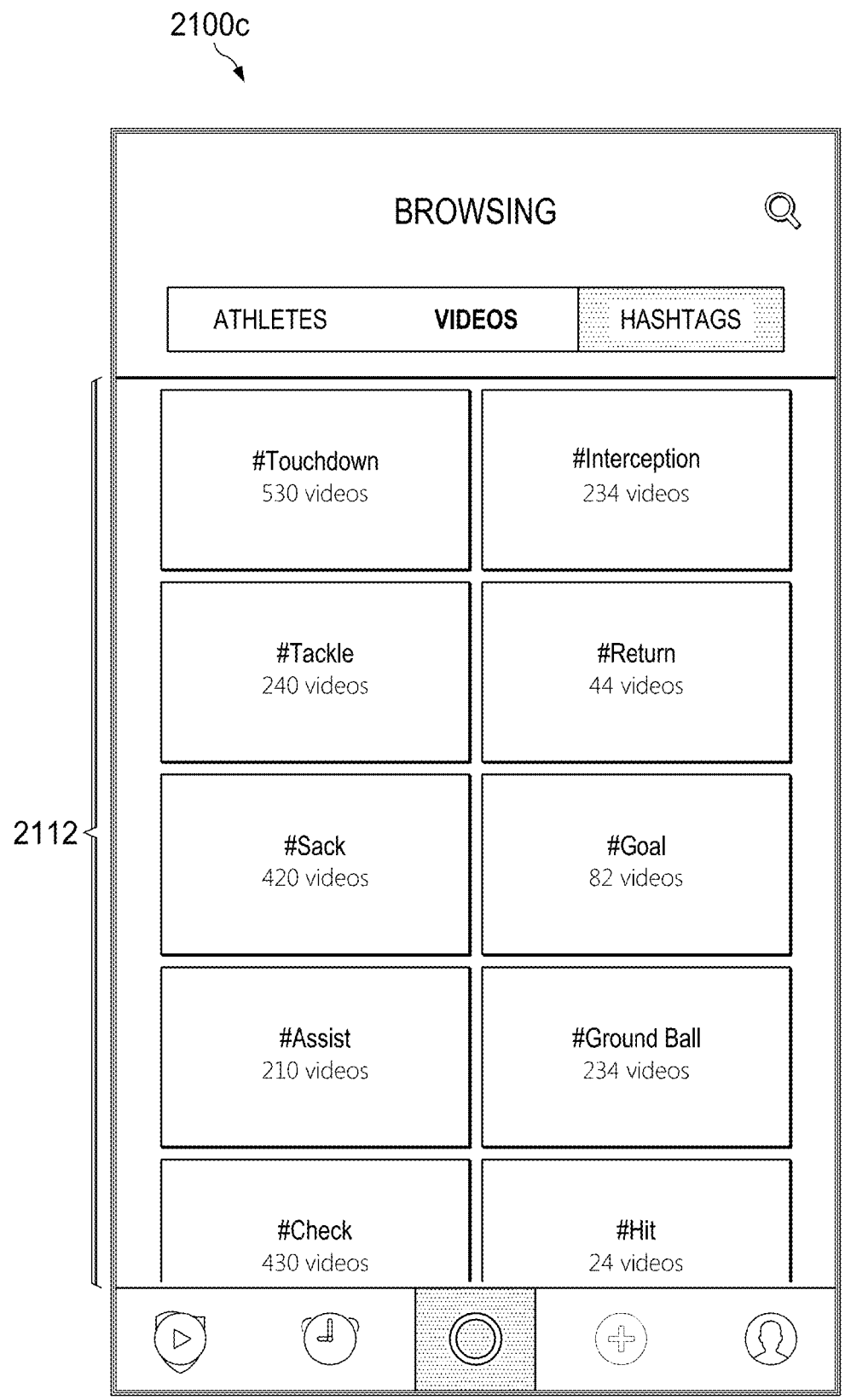

With regard to FIG. 21A, a screenshot of an illustrative user interface 2100 may provide for a user to browse content collected at one or more events by selecting an "athletes" soft-button 2102a, "videos" soft-button 2102b, and "hashtags" soft-button 2102c is shown. Selection of the "athletes" soft-button 2102a may cause a list of athletes 2104 from which the user may select to follow one or more athletes 2106 by pressing a "follow" soft-button from a corresponding list of soft-buttons 2108. As shown in FIG. 21B, responsive to a user selecting the "videos" soft-button 2102b, a user interface 2100b may include a list of video segments 2110 may be displayed for a user to review and select individual video segment(s). As shown in FIG. 21C, responsive to a user selecting the "hashtags" soft-button 2102c, a user interface 2100c may include a list of available hashtags 2112 and number of video segments or clips having respective hashtags associated therewith. As an example, a # Touchdown hashtag has 530 videos associated therewith. More detailed search parameters may help to narrow down the videos inclusive of the # Touchdown hashtag.

Figure 22A:
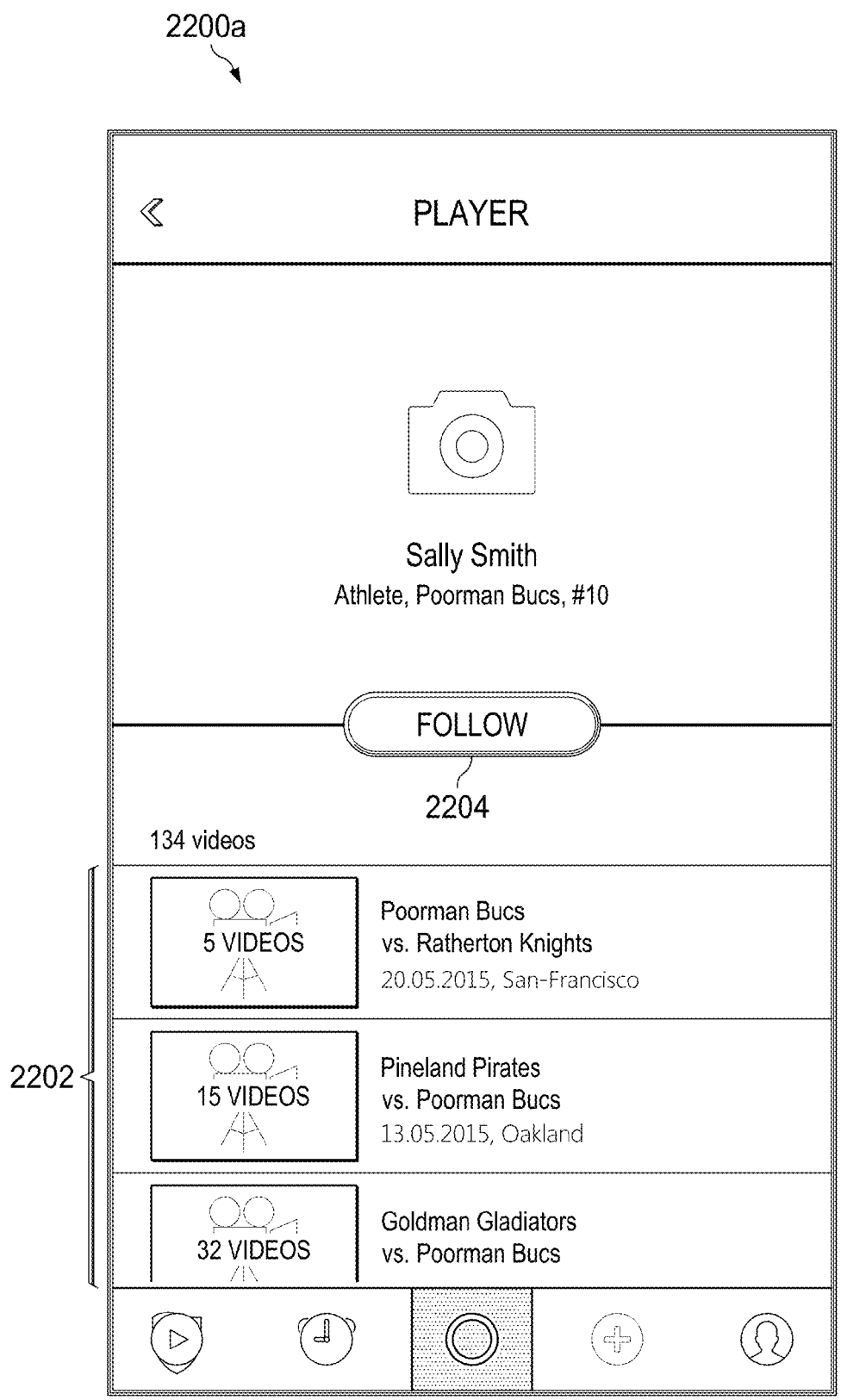
FIGS. 22A-22C are screenshots of user interfaces that may provide for searching for videos.
Figure 22B:
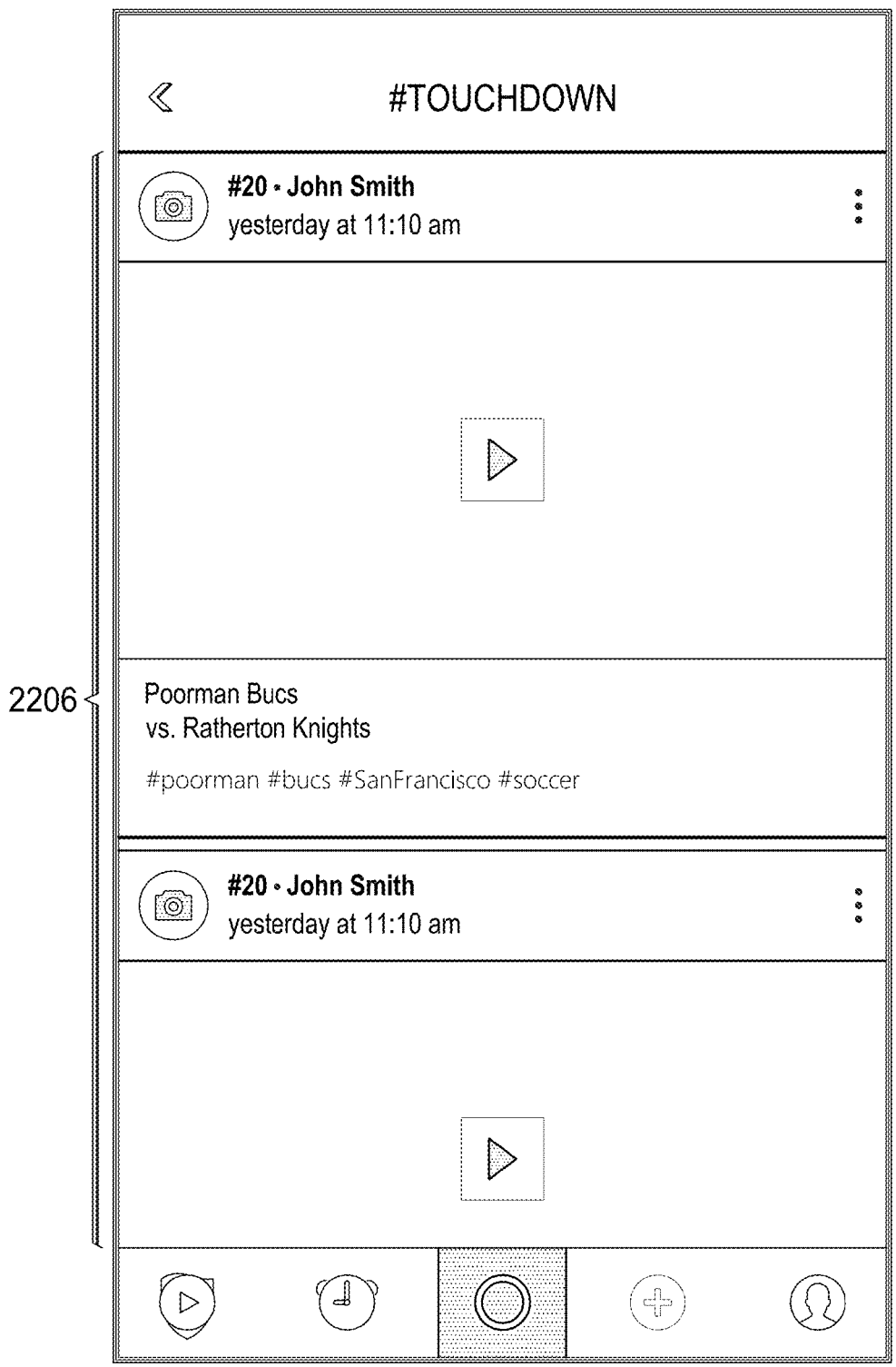
Figure 22C:
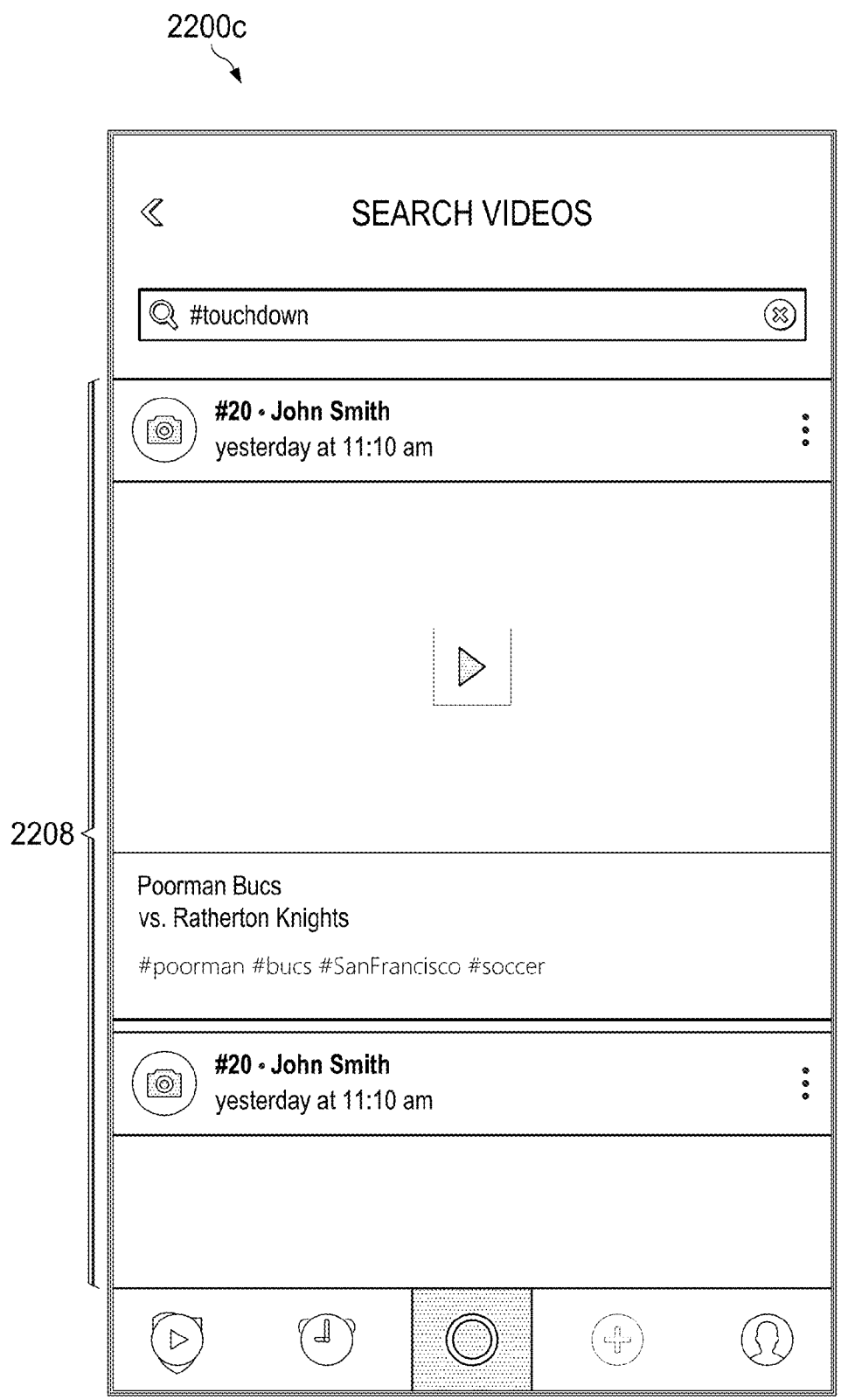

With regard to FIGS. 22A-22C, user interfaces 2200a-2200c may provide for searching for videos are shown. In FIG. 22A, the user interface 2200a may include a list of videos 2202 associated with a particular player. The list of videos 2202 may include all videos of the player from one or more sporting events. A "follow" soft-button 2204 may enable the user to follow the player. In FIG. 22B, the user interface 2200b may include a list of videos 2206 inclusive of one or more players and having a particular hashtag, in this case # touchdown, associated therewith. In FIG. 22C, the user interface 2200c may provide for a search so that the user may search for videos that are associated with a particular player and hashtag, for example, and a list of videos 2208 may be displayed in response to a search.

Figure 23:
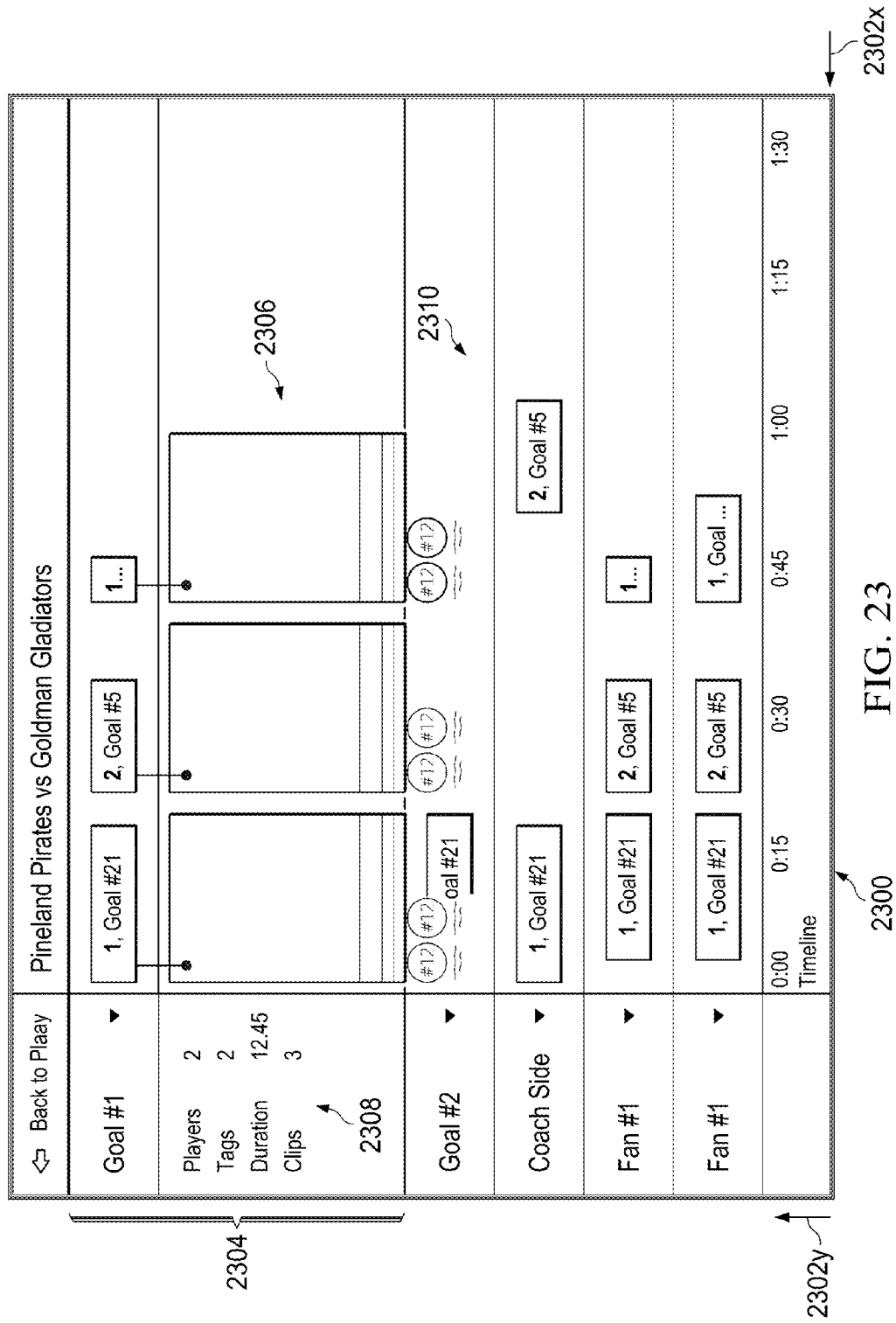
FIG. 23 is a user interface that may provide for a video editing environment in which video clips taken by different users at different angles may be listed along a first axis and time of the video clips may be along a second axis.

With regard to FIG. 23, a user interface 2300 may provide for a video editing environment in which video clips taken by different users at different angles may be listed along a first axis 2302y and time of the video clips may be along a second axis 2302x is shown. The different users that collect the video clips may be located around a sporting event, for example. In one embodiment, the user may enter a location relative to a field (e.g., home team side, 30 yard line), and the location may be used for positioning relative to other video clips collected from a sporting event, in this case the Oakland Riders vs Golden State Warriors game. A first composite video 2304 is shown to be assembled from multiple video clips 2306, in this case three video clips. The composite video 2304 has associated information 2308, including number of players, number of tags, duration, and number of video clips. Available video clips 2310 that meet a search criteria (e.g., player number(s), hashtag(s), or otherwise) may be listed and available for a user to select to include in a composite or extracted video. By providing for each of the video clips with crowd sourced tags, a user may be able to identify and select video content in a fast and easy manner and at angles not possible for a single user to obtain. Various video editing functions, such as clipping, zooming, transitioning, etc., as understood in the art, may be provided, as well. In one embodiment, the editing deck may be automated so that the user is able to receive a composite video without having to perform custom selection or editing.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the," is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the following claims and the principles and novel features disclosed herein.

What is claimed:

1. A method for creating a sports video, said method comprising:
   receiving, by a processing unit, video of a sporting event inclusive of players with unique identifiers on their respective uniforms;
   identifying, by the processing unit, at least one unique identifier of the players in the video;
   defining, by the processing unit, start times of video segments from the video at an initial time that the at least one unique identifier enters a respective video segment;
   determining whether a certain number of frames or seconds between identifying the at least one unique identifier within the respective video segments has passed without identifying the at least one unique identifier;
   if a determination is made that a certain number of frames or seconds has passed since a previous time that a respective player associated with the at least one unique identifier was identified in the respective video segments, setting a final time of the respective video segments at the previous time that the player associated with the at least one unique identifier was identified,
   otherwise, waiting to set a final time of the respective video segments until a determination is made that a certain number of frames or seconds has passed since a previous time that a player associated with the at least one unique identifier was identified in the respective video segments;
   defining, by the processing unit, stop times of each of the respective video segments at the final time that the at least one unique identifier is in the video relative to the respective start times; and
   causing, by the processing unit, video segments inclusive of the at least one unique identifier to be individually available for replay.

2. The method according to claim 1, further comprising enabling, by the processing unit, a user to assemble select video segments into a composite video.

3. The method according to claim 1, further comprising wherein receiving video of the sporting event includes receiving video of the sporting event from a plurality of video capture devices at the sporting event.

4. The method according to claim 3, further comprising:
   identifying, by the processing unit, video segments from the video from any of the video capture devices in which one or more players associated with the at least one unique identifier is included; and
   distributing the video segments with the at least one unique identifier to a user of one of the video capture devices in response to a request from the user.

5. The method according to claim 1, further comprising:
   enabling, by the processing unit, a user to view the one or more video segments; and
   in response to receiving one or more hashtags from the user that associate the one or more hashtags with the one or more video segments, storing the one or more hashtags in association with respective video segments, the hashtags being indicative of respective events that occur in the associated video segments.

6. The method according to claim 5, wherein associating the one or more hashtags with the video segments is in response to receiving subsets of the one or more hashtags associated with the video segments from one or more users such that each video segment includes each unique hashtag from the subsets of hashtags.

7. The method according to claim 5, further comprising enabling a user to request video segments having one or more hashtag associated therewith.

8. The method according to claim 7, further comprising generating a composite video inclusive of at least a portion of the video segments inclusive of the requested one or more hashtags.

9. The method according to claim 1, wherein receiving the video includes receiving the video in video segments while the video is being captured until the video being captured is complete, and stitching the successive video segments together until a full video is completed, and wherein identifying includes identifying the at least one unique identifier in response to receiving each of the video segments.

10. The method according to claim 1, further comprising synchronizing, by the processing unit, video captured from different video cameras of the sporting event.

11. The method according to claim 1,
wherein receiving the video of the sporting event includes receiving the video of the sporting event from multiple camera angles;
further comprising enabling, by the processing unit, a user to select a video from a camera angle with a desired image of a unique identifier associated with a respective player; and
wherein identifying includes identifying the at least one unique identifier in the selected video.

12. The method according to claim 1, further comprising:
receiving, by the processing unit, at least one hashtag associated with the video segments; and
identifying, by the processing unit, one or more video segments associated with a selected hashtag; and
communicating, via a communications network, the identified one or more video segments associated with the selected hashtag to a user for viewing.

13. The method according to claim 1,
wherein receiving the video of the sporting event includes receiving the video of the sporting event from multiple camera angles;
further comprising synchronizing, by the processing unit, the videos captured from each of the angles;
wherein identifying the at least one unique identifier includes identifying the at least one identifier from the synchronized videos; and
assigning, by the processing unit, a player with the unique identifier in each of the synchronized videos.

14. A method for generating video content, said method comprising:
receiving, by a processing unit, a plurality of video content segments of a sporting event from video capture devices, the video capture devices operating to crowd source video content;
identify, by the processing unit, a player in one or more of the video content segments;
defining a start time in the one or more video content segments at an initial time that the player enters a respective video content segment;
determining whether a certain number of frames or seconds between identifying the player within the respective video content segments has passed without identifying the player;
if a determination is made that a certain number of frames or seconds has passed since a previous time that the player was identified in the respective video content segments, setting a final time of the respective video content segments at the time that the player was identified,
otherwise, waiting to set a final time of the respective video content segments until a determination is made that a certain number of frames or seconds has passed since a previous time that the player was identified in the respective video content segments;
defining a stop time in the one or more video content segments at the final time that the player is in the video content segments;
extracting, by the processing unit, at least a portion of video content from the start time to the stop time and inclusive of the player from the one or more video content segments with the player; and
enabling, by the processing unit, the at least a portion of the extracted video content segments with the player to be available for viewing by a user.

15. The method according to claim 14, wherein identifying includes identifying an identifier and colors displayed on a uniform of the player.

16. The method according to claim 14, further comprising receiving a query inclusive of a hashtag associated with one or more of the extracted video content segments.

17. The method accorded to claim 14, further comprising:
receiving a timestamp with each of the video content segments; and
synchronizing the video content segments based on the timestamp.

18. The method according to claim 14, further comprising:
identifying a standard object within the video content; and
determining a scaling in the video content based on the standard object size of the object; and
determining a position of the player relative to an object within the video content.

19. The method according to claim 14, further comprising:
receiving a search request inclusive of a search parameter inclusive of a hashtag;
identifying video content in which the player is captured and hashtag is associated; and
providing the identified video content in response to the search request.

20. The method according to claim 14, wherein receiving the video content segments includes receiving the video content segments while the video is being captured until the video being captured is complete, and further comprising stitching the successive video segments together until a full video is completed, and wherein identifying includes identifying the player in response to receiving each of the video segments.

21. The method according to claim 14, further comprising associating at least one hashtag with the extracted video content segments that enables identification of the extracted video content segments by a search engine.

22. The method according to claim 1, further comprising in response to determining a start time of a video segment, tracking a player associated with the unique identifier, thereby identifying entire segments during which a player associated with the unique identifier is in the video segment.

23. The method according to claim 5, wherein receiving one or more hashtags includes receiving one or more hashtags that are predetermined and made available to the user for selection thereof.

24. The method according to claim 23, further comprising predefining the hashtags from which the one or more hashtags are available for selection based on type of the sporting event.

25. The method according to claim 1, wherein defining start times and stop times at respective initial times and final times includes defining start times and stop times inclusive of a buffer time prior to and after the respective start and stop times.

* * * * *